US008914642B2

(12) United States Patent
Hayashi

(10) Patent No.: US 8,914,642 B2
(45) Date of Patent: Dec. 16, 2014

(54) PERSON ONESELF AUTHENTICATING SYSTEM AND PERSON ONESELF AUTHENTICATING METHOD

(75) Inventor: Makoto Hayashi, Tokyo (JP)

(73) Assignee: The Bank of Tokyo-Mitsubishi UFJ, Ltd., Tokyo (JP)

( * ) Notice: Subject to any disclaimer, the term of this patent is extended or adjusted under 35 U.S.C. 154(b) by 910 days.

(21) Appl. No.: 12/285,124

(22) Filed: Sep. 29, 2008

(65) Prior Publication Data

US 2009/0094690 A1 Apr. 9, 2009

Related U.S. Application Data

(63) Continuation of application No. PCT/JP2006/310923, filed on May 31, 2006.

(30) Foreign Application Priority Data

Mar. 29, 2006 (JP) .................................. 2006-089869

(51) Int. Cl.
G06F 21/00 (2013.01)
G06F 21/31 (2013.01)

(52) U.S. Cl.
CPC ...................................... G06F 21/31 (2013.01)
USPC ........................................... 713/182; 713/183

(58) Field of Classification Search
None
See application file for complete search history.

(56) References Cited

U.S. PATENT DOCUMENTS 5,465,084 A * 11/1995 Cottrell ......................... 340/5.27
6,168,157 B1 * 1/2001 Beckman et al. ............. 273/237
6,720,860 B1 * 4/2004 Narayanaswami .......... 340/5.54
6,744,422 B1 * 6/2004 Schillings et al. ............ 345/169
6,755,661 B2 * 6/2004 Sugimoto ..................... 434/322
7,400,878 B2 * 7/2008 Hassan et al. ................. 455/410
8,523,660 B2 * 9/2013 Jacob .............................. 463/23
2001/0044906 A1 * 11/2001 Kanevsky et al. ............ 713/202
2002/0018983 A1 * 2/2002 Dixon ........................... 434/227
2002/0029341 A1 * 3/2002 Juels et al. .................... 713/184
2004/0030934 A1 * 2/2004 Mizoguchi et al. .......... 713/202
2004/0054929 A1 * 3/2004 Serpa ............................ 713/202
2004/0093527 A1 * 5/2004 Pering et al. ................. 713/202
2005/0010768 A1 * 1/2005 Light et al. ................... 713/168
2007/0146315 A1 * 6/2007 Ide ............................... 345/156
2007/0178971 A1 * 8/2007 Bates et al. .................... 463/43
2008/0184363 A1 * 7/2008 Narasimhan .................. 726/18

FOREIGN PATENT DOCUMENTS

| JP | 3-126095 |  | 5/1991 |
| --- | --- | --- | --- |
| JP | 4-98389 | A | 3/1992 |
| JP | 9-305541 |  | 11/1997 |
| JP | 2000-90051 | A | 3/2000 |
| JP | 2001-02785 | A | 4/2001 |
| JP | 200192785 |  | 4/2001 |
| JP | 2004-46553 |  | 2/2004 |
| JP | 2005-537574 | A | 12/2005 |

* cited by examiner

*Primary Examiner* — Krista Zele
*Assistant Examiner* — Matthew Lindsey
(74) *Attorney, Agent, or Firm* — Baker Hostetler LLP

(57) ABSTRACT

There is provided person oneself authenticating means for authentication of a user, which is highly secure and realizable by functions ordinarily provided by a PC, mobile phone, etc., and which is less burdensome than typical user authentication key management and authentication operations. Sound or an image is adopted as an authentication key for person oneself authentication. Authentication data is edited by combining an authentication key, which is selected by a registered user, and sound or an image that is other than the authentication key, and the authentication data is continuously reproduced in a user terminal. A time in which a user has discriminated the authentication key from the reproduced audio or video is compared with a time in which the authentication key should normally be discriminated, which is specified from the authentication data. When both times agree, the user is authenticated as a registered user.

2 Claims, 14 Drawing Sheets

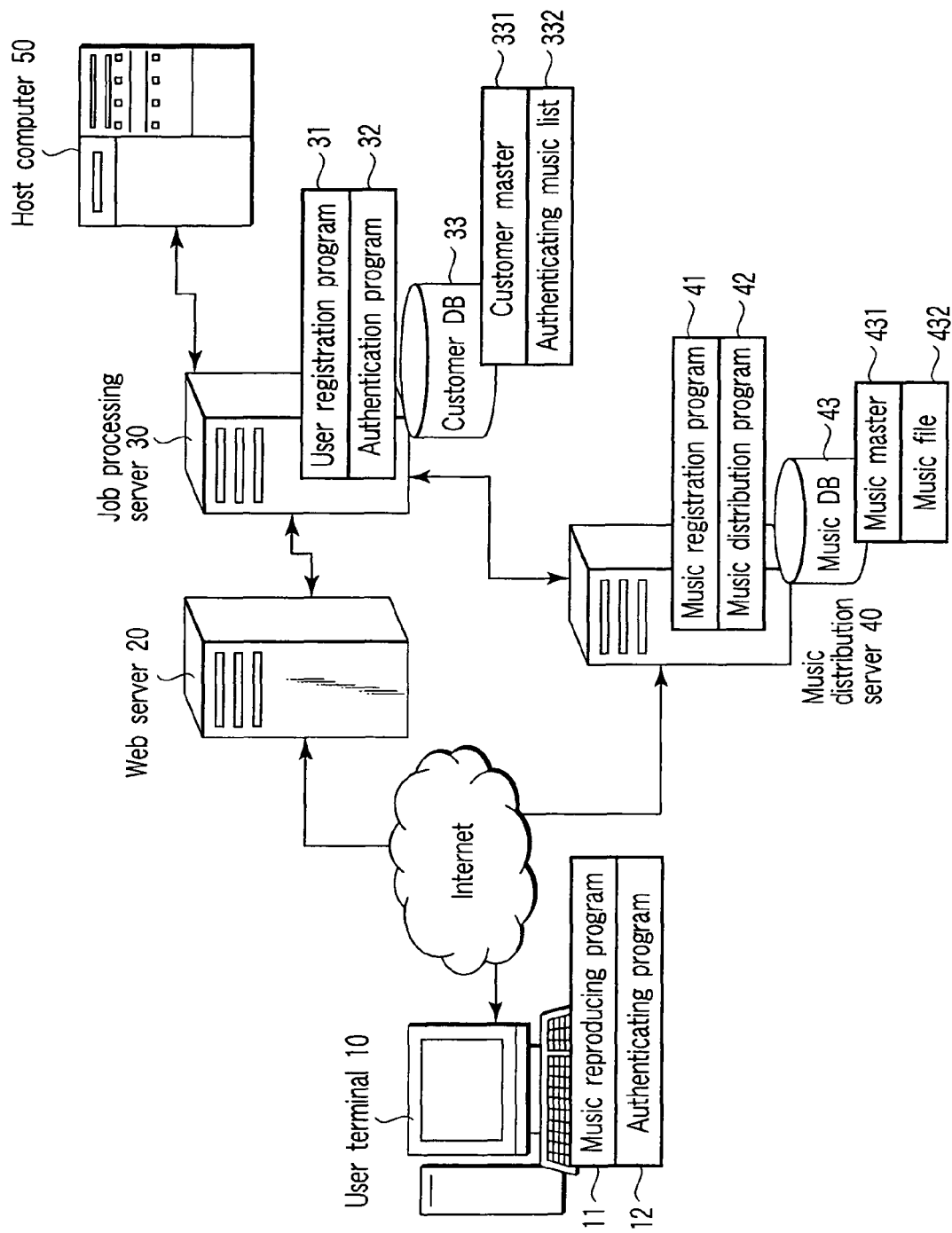
F I G. 3

| Account number | Account name | ... | Password | Secret number (for registration) | ... |
|---|---|---|---|---|---|
| 0123456 | ○○○○ | ... | 1234 | 4321 | ... |
| 1234567 | △△△△ | ... | 5678 | 8765 | ... |
| ⋮ | ⋮ | ⋮ | ⋮ | ⋮ | ⋮ |

FIG. 4

| Authentication ID | Authenticating music 1 | Authenticating music 2 | Authenticating music 3 | Authenticating music 4 | ... | Tmin | Tch | Tjd | ... |
|---|---|---|---|---|---|---|---|---|---|
| MTB001 | 0123 | 8901 | 3690 | 2468 | ... | 5 | 2 | 1 | ... |
| UFJ002 | 4567 | 7890 | 1234 | 5678 | ... | 5 | 1 | 1 | ... |
| ⋮ | ⋮ | ⋮ | ⋮ | ⋮ | ⋮ | ⋮ | ⋮ | ⋮ | ⋮ |

FIG. 5

| | Trial-listening | Song title | Singer | Genre | Music code | ... |
|---|---|---|---|---|---|---|
| ○ | 🔊 | abc | ABCD | pop | 0123 | ... |
| | 🔊 | def | EFGH | rock | 4567 | ... |
| ○ | 🔊 | ghi | IJKL | R&B | 8901 | ... |
| ⋮ | ⋮ | ⋮ | ⋮ | ⋮ | ⋮ | ⋮ |

Select song for authentication from list

FIG. 6

AT[n] = (000000, 0111111, 110000, 001100000, 0111111, 100000, 0011111, 1100111,···)
AT'[n] = (000, 1111, 000, 100000, 1111, 000, 1111, 0111,···)
AT'[n] = (000, 1111, 000, 100000, 1111, 000, 1111, 0111,···)
YN[n] = (0, 1, 0, 0, 1, 0, 1, 1,···)
F I G. 12
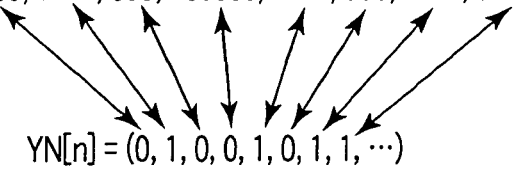
F I G. 13

PERSON ONESELF AUTHENTICATING SYSTEM AND PERSON ONESELF AUTHENTICATING METHOD

CROSS REFERENCE TO RELATED APPLICATIONS

This is a Continuation Application of PCT Application No. PCT/JP2006/310923, filed May 31, 2006, which was published under PCT Article 21(2) in Japanese.

This application is based upon and claims the benefit of priority from prior Japanese Patent Application No. 2006-089869, filed Mar. 29, 2006, the entire contents of which are incorporated herein by reference.

BACKGROUND OF THE INVENTION

1. Field of the Invention

The present invention relates to a person oneself authenticating system and a person oneself authenticating method for authenticating whether a user, who accesses a transaction system from a terminal device, is a registered user, by using a sound or an image as an authentication key.

2. Description of the Related Art

At present, in an Internet transaction system such as Internet banking, a system in which a password is memorized or a system using a contractor's card on which a number for authentication is recorded (see, e.g. Patent Document 1) is generally adopted as user authentication means. In these systems, however, the user is forced to memorize the password or to manage the contractor's card, and the problem is how to avoid a risk, such as unlawful use of the password or loss of the contractor's card.

In ATMs of banks or the like, in particular, with recent serious problems of leakage of passwords, the introduction of an IC card system and a biometrics system has been promoted in order to perform person oneself authentication with higher security. Besides, there has been disclosed an invention in which a melody is used as an authentication key as authentication means which is easier for the user to memorize and is higher in security than passwords, and the melody is compared with a melody that is input by the user, thereby performing person oneself authentication (see, e.g. Patent Document 2).

In addition, there has been proposed a candidate presentation/selection system as an authentication system which requires no dedicated reading apparatus or the like, unlike the IC card system or biometrics system, and is relatively easy to introduce, wherein a user's personal information is registered in advance in a server side, valid information which is mixed with dummy information is presented at a time of login, and person oneself authentication is executed on the basis of whether the valid information is selected from the presented information (see, e.g. Patent Document 3).

Patent Document 1: Jpn. Pat. Appln. KOKAI Publication No. H9-305541,

Patent Document 2: Jpn. Pat. Appln. KOKAI Publication No. H3-126095, and

Patent Document 3: Jpn. Pat. Appln. KOKAI Publication No. 2004-46553.

BRIEF SUMMARY OF THE INVENTION

Problems to be Solved by the Invention

Of these authentication systems, the password system and the contractor card system have the above-described problems. The IC card system and the biometrics system require the provision of a dedicated reading device or the like, and there is a problem that these systems are not suited to, e.g. the Internet banking in which a user's personal belonging such as a PC (Personal Computer) or a mobile phone is used in usual cases. As regards the melody authentication system as disclosed in Patent Document 2, there is such an operational burden on the user that a melody which becomes an authentication key has to be input, as well as a burden that the melody has to be memorized so that it may exactly be input.

The candidate presentation/selection system can be realized by functions ordinarily provided in a PC or a mobile phone and, as disclosed in Patent Document 3, the burden on the user that the user has to memorize the authentication key is relaxed by using the user's personal information for authentication. However, in the case of a simple selection system, there is a high risk of accidental agreement with a right answer or a risk of guessing of the user's personal information. For this reason, there is a problem that this system is not sufficient in terms of safety.

The present invention has been made in order to solve these problems. The object of the invention is to provide a person oneself authenticating system and a person oneself authenticating method for authenticating whether a user, who has accessed a transaction system from a terminal device, is a registered user or not by using sound or video as an authentication key, as person oneself authenticating means which is mainly used for Internet banking or the like and is high in security, and can be carried out by functions ordinarily provided in a PC, a mobile phone, or the like while the authenticating means is less in burden required for user authentication key management and authentication operations.

Means for Solving the Problems

A first invention for solving the problems relating to the present application is a person oneself authenticating system, provided in a transaction system, for authenticating whether a user who has accessed the transaction system from a terminal device is a registered user, comprising: authentication request accepting means for accepting an authentication request by the user who has accessed from the terminal device; authentication key list memory means for storing one or two or more authentication keys, which are selected by the registered user, as an authentication key list; authentication data creating means for selecting at least one authentication key from the authentication key list, which is stored in the authentication key list memory means, of the user whose authentication request is accepted, combining at least a part of authentication key data, which constitutes the authentication key, and at least a part of key data of one or two or more keys, which are not included in the authentication key list, thereby creating authentication data which is continuously reproduced; authentication data transmission means for transmitting the authentication data to the terminal device; authentication information reception means for receiving authentication information which is generated by an authenticating action which is performed by the user on the terminal device by reproducing the authentication data in the terminal device; and authentication information collation means for collating the authentication information and normal authentication information which is specified from the authentication data, thereby determining whether the user is an authenticated person, wherein each of the authentication key data and the key data, which are used in the authentication data creating means, is sound source data or image data, which varies with time at a time of reproduction, the authentication information, which is received by the authentication information reception means, is data for specifying a time in which the authentication key recognized by the user is reproduced, the data being generated from a time in which an authentication operation, which is executed by the user by recognizing that the authentication key is being reproduced, is accepted in the terminal device during the reproduction of the authentication data, and the authentication information collation means collates whether the time in which the authentication key is reproduced, which is specified from the authentication information, agrees with a time in which the authentication key should be reproduced, which is specified from the authentication data, thereby determining whether the user is the authenticated person.

A second invention for solving the problems relating to the present application is a person oneself authenticating system, provided in a transaction system, for authenticating whether a user who has accessed the transaction system from a terminal device is a registered user, comprising: authentication request accepting means for accepting an authentication request by the user who has accessed from the terminal device; authentication key list memory means for storing one or two or more authentication keys, which are selected by the registered user, as an authentication key list; authentication data creating means for selecting at least one authentication key from the authentication key list, which is stored in the authentication key list memory means, of the user whose authentication request is accepted, designating a combination between the authentication key and a time of reproduction of the authentication key and one or two or more keys, which are not included in the authentication key list, and a time of reproduction of the one or two or more keys, thereby creating authentication data which is continuously reproduced; authentication data transmission means for transmitting the authentication data to the terminal device; authentication information reception means for receiving authentication information which is generated by an authenticating action which is performed by the user on the terminal device by reproducing the authentication data in the terminal device; and authentication information collation means for collating the authentication information and normal authentication information which is specified from the authentication data, thereby determining whether the user is an authenticated person, wherein each of the authentication key and the key, which are used in the authentication data creating means, specifies sound or an image, which is reproduced at a time of authentication, the authentication information, which is received by the authentication information reception means, is data for specifying a time in which the authentication key recognized by the user is reproduced, the data being generated from a time in which an authentication operation, which is executed by the user by recognizing that the authentication key is being reproduced, is accepted in the terminal device during the reproduction of the authentication data, and the authentication information collation means collates whether the time in which the authentication key is reproduced, which is specified from the authentication information, agrees with a time in which the authentication key should be reproduced, which is specified from the authentication data, thereby determining whether the user is the authenticated person.

In the present invention (including the first invention and second invention; the same applies to the below), sound, image, etc. are adopted as authentication keys for person oneself authentication. The authentication key, which is selected by the registered user, and the key other than the authentication key are combined and continuously reproduced. The person oneself authentication is executed on the basis of whether the use, who listens to the reproduced sound or views the reproduced image, has exactly selected the time in which the authentication key is reproduced. According to this method, by the number, length and combination of sounds and images, the probability of accidental agreement can remarkably be reduced. In addition, the authentication can be executed by the audio reproducing function or image reproducing function which is ordinarily provided in the PC or mobile phone. Furthermore, since authentication can be executed with a simple operation by the auditory sense, the authentication method with a less operational burden on the user can be provided.

In the first invention, sound source data or image data, which varies with time at the time of reproduction, is adopted as the sound or image that is used as the authentication key and the key. In the case of using the sound source data, the kind of sound that is used for authentication is not particularly limited. Sound effects or voice may be used. If consideration is given to easy learning by the user, the use of a music file is preferable. Similarly, in the case of using image data, the kind of image is not particularly limited, but it is preferable to use an image file which is easy for the user to discriminate. In the present invention, all or a part of such sound source data or image data is arranged to create the authentication data. The order of arrangement and the reproduction time of the sound source data or the like in the authentication data are not particularly limited. The sound source data or the like may be arranged at random or may be arranged on the basis of some algorithm.

In the second invention, sound or an image, which is reproduced at the time of authentication, is designated as each of the authentication key or the key. The authentication data is created by specifying the combination between the sound or image that is reproduced and the time of reproduction. In the case of using sound, for example, authentication data is created such that different sound effects including the sound corresponding to the authentication key are continuously reproduced. In the case of using images, for example, authentication data is created such that different still images including the image corresponding to the authentication key are displayed while being switched. The image to be displayed may represent a picture, a photo, characters, numerals, symbols, etc. In the second invention, too, the order of arrangement and the reproduction time of the sound or images in the authentication data are not particularly limited.

The present invention may be characterized in that the authentication information, which is received by the authentication information reception means and is the data for specifying the time in which the authentication key recognized by the user is reproduced, is composed of bits which discriminate whether the authentication operation has been accepted or not, the bits being recorded in every unit time during the reproduction of the authentication data in the terminal device, and the authentication information collation means determines that the user is the authenticated person, in a case where the bits recorded in the authentication information, which correspond to the time in which the authentication key should be reproduced, which is specified from the authentication data, indicate that the authentication operation has been accepted.

With this structure, by collating the bits recorded in the authentication information with the time in which the authentication key should be reproduced, it becomes possible to easily determine whether the user is the authenticated person, by the authentication operation that is executed by the user.

The present invention may be characterized in that the authentication information collation means creates first sequence data composed of first bit strings into which the bits recorded in the authentication information are divided in units of a time of reproduction of the authentication key or the key in accordance with a time of change of the reproduction of the authentication key or the key, which is specified from the authentication data, creates second sequence data composed of second bit strings which are formed by deleting bits corresponding to a predetermined grace time from a first bit of each of the first bit strings in the first sequence data, and determines, from each of the second bit strings in the second sequence data, whether the authentication operation has been accepted or not, with respect to each time in which the authentication key or the key has been reproduced.

Further, the present invention may be characterized in that the authentication information collation means creates first sequence data composed of first bit strings into which the bits recorded in the authentication information are divided in units of a time of reproduction of the authentication key or the key in accordance with a time of change of the reproduction of the authentication key or the key, which is specified from the authentication data, creates second sequence data composed of second bit strings which are formed by deleting bits corresponding to a predetermined grace time from a first bit of each of the first bit strings in the first sequence data, specifies a predetermined number of last bits of each of the second bit strings in the second sequence data, and determines whether the authentication operation has been accepted or not, with respect to each time in which the authentication key or the key has been reproduced.

The invention may be characterized in that the grace time is set for each individual user by a total value of a time that is needed for the user to determine a change of the key, and a time that is needed for judging the authentication key, and the authentication information collation means creates, at a time of creating the second sequence data, the second sequence data by using the second bit string from which only the bit, which corresponds to the time that is needed for judging the authentication key, is deleted with respect to the authentication key or the key which is positioned at a beginning of the authentication data.

The invention may be characterized in that the authentication data creating means sets the time of reproduction of each of the authentication key and the key, which are used in the authentication data, at least at a time that is longer than the time in which the time corresponding to the bit number necessary for authentication is added to the grace time, thereby creating the authentication data.

Further, the present invention may be characterized in that the authentication information collation means creates sequence data composed of bit strings into which the bits recorded in the authentication information are divided in units of a time of reproduction of the authentication key or the key in accordance with a time of change of the reproduction of the authentication key or the key, which is specified from the authentication data, specifies a predetermined number of last bits of each of the bit strings in the sequence data, and determines whether the authentication operation has been accepted or not, with respect to each time in which the authentication key or the key has been reproduced.

The invention may be characterized in that the authentication data creating means sets the time of reproduction of each of the authentication key and the key, which are used in the authentication data, at a time that is longer than the time corresponding to a predetermined number of bits which are specified in the authentication information collation means, thereby creating the authentication data.

When a user's authentication operation is recorded as bits in authentication information, it is possible that there occurs so-called "jitter" which is a time error between the switching of sound or an image, which is reproduced, and the execution of the authentication operation by the user. In order to perform exact judgment by coping with the jitter, it is preferable to delete bits corresponding to the "jitter" from the object of determination. The time corresponding to the "jitter" comprises the time that is needed for the user to judge the change of the key and the time that is needed to judge the authentication key, and is set by taking into account the individual differences of users, such as the ages. As regards the authentication key or the key which is positioned at the beginning of the authentication data, it is preferable to delete only the time, which is needed to judge the authentication key, from the object. In addition, in order to enable judgment even if "jitter" is eliminated, it is preferable to set the reproduction time of each of the authentication key and the key at a time that is longer than the time in which the time corresponding to the bit number necessary for authentication is added to the time corresponding to "jitter".

There is another method for coping with "jitter". Even if some erroneous operation occurs at the time of the change of the sound or image that is reproduced, it is considered that the user himself/herself can correctly execute the authentication operation at the last part of the reproduction of each sound or image. Thus, in the above-described part of the structure, the person oneself authentication is executed on the basis of whether a predetermined number of last bits of each bit string indicate the correct authentication operation. This method may be used in combination with the above-described method of deleting the beginning part, or may be used singly. In order to secure the recording of the predetermined number of bits that are necessary for determination, it is preferable to set the reproduction time of each of the authentication key or the key at a time which is longer than the time corresponding to the predetermined number of bits.

The present invention may be characterized in that the terminal device includes authentication program transmission means for transmitting a program which records, when the authentication data is reproduced in the terminal device, the time in which the authentication operation, which is performed by the user by recognizing that the authentication key is being reproduced, is detected, and the time in which the authentication operation is not detected, from the start time of the reproduction of the authentication data, thereby generating the authentication information that is to be transmitted to the transaction system.

The PC or mobile phone, which is used as the terminal device, needs to have the function of generating the authentication information by measuring the time in which the user recognizes and selects the authentication key at the time of reproduction, as well as the function of reproducing the authentication data such as sound source data or image data. In this structure, the program for executing this function is distributed on-line from the transaction system side.

Further, the present invention may be characterized by including designated key list memory means for storing a designated key list in which keys that are usable as authentication keys are designated; candidate key list transmission means for creating a candidate key list in which two or more keys that are selectable as authentication keys are selected from the designated key list according to a predetermined condition, and transmitting the candidate key list to the terminal device; and authentication key information accepting means for accepting, from the terminal device, information which specifies keys that are selected from the candidate key list by the registered user as authentication keys. The authentication key list memory means stores, as an authentication key list, the authentication keys that are specified from the information that is accepted by the authentication key information accepting means.

In consideration of the convenience for the user, it is preferable that the keys, which are used as the authentication keys, be selected and registered by the user himself/herself. However, if the user himself/herself selects the keys from all the keys that can be designated, it is possible that the kind of keys, which are selected, are guessed by attributes of the user (for example, "young people would like pops" in the case of using music as authentication keys). Thus, in this structure, the candidate key list is narrowed down so that the attributes are hard to guess on the transaction system side, and the user is made to select the keys from this candidate key list.

Further, the present invention may be characterized by including master information memory means for storing master information including the ID code and name of the registered user; and user ID generating means for generating, by applying a predetermined function to at least one item of the master information, a user ID for identifying the registered user by whom the authentication key list is stored in the authentication key list memory means. The user ID and the authentication key list are associated and stored in the authentication key list memory means.

The information, which specifies the authentication keys that are selected by the user, is very important information as the key for person oneself authentication. In order to more securely manage this information, the information is managed separately from the master information of the registered user, as in the present structure, and the linking to each individual user is made by an ID which is obtained by hashing a part of the master information. Thereby, the security is enhanced.

Further, the present invention can be specified as a person oneself authenticating method which is executed by the person oneself authenticating system according to the present invention.

The person oneself authenticating method, which corresponds to the first invention, is a person oneself authenticating method for authenticating, in a transaction system, whether a user who has accessed the transaction system from a terminal device is a registered user, comprising: an authentication request accepting step of accepting, by the transaction system, an authentication request by the user who has accessed from the terminal device; an authentication data creating step of selecting, by the transaction system, at least one authentication key from an authentication key list of the user whose authentication request is accepted, the authentication key list being stored in an authentication key list memory unit that stores an authentication key, which is selected by the registered user, as the authentication key list, combining at least a part of authentication key data of the authentication key and at least a part of key data of one or two or more keys, which are not included in the authentication key list, thereby creating authentication data which is continuously reproduced; an authentication data transmission step of transmitting, by the transaction system, the authentication data to the terminal device; an authentication information reception step of receiving, by the transaction system, authentication information which is generated by an authenticating action which is performed by the user on the terminal device by reproducing the authentication data in the terminal device; and an authentication information collation step of collating, by the transaction system, the authentication information and normal authentication information which is specified from the authentication data, thereby determining whether the user is an authenticated person, wherein each of the authentication key data and the key data, which are used in the authentication data creating step, is sound source data or image data, which varies with time at a time of reproduction, the authentication information, which is received in the authentication information reception step, is data for specifying a time in which the authentication key recognized by the user is reproduced, the data being generated from a time in which an authentication operation, which is executed by the user by recognizing that the authentication key is being reproduced, is accepted in the terminal device during the reproduction of the authentication data, and the authentication information collation step collates whether the time in which the authentication key is reproduced, which is specified from the authentication information, agrees with a time in which the authentication key should be reproduced, which is specified from the authentication data, thereby determining whether the user is the authenticated person.

The person oneself authenticating method, which corresponds to the second invention, is a person oneself authenticating method for authenticating, in a transaction system, whether a user who has accessed the transaction system from a terminal device is a registered user, comprising: an authentication request accepting step of accepting, by the transaction system, an authentication request by the user who has accessed from the terminal device; an authentication data creating step of selecting, by the transaction system, at least one authentication key from an authentication key list of the user whose authentication request is accepted, the authentication key list being stored in an authentication key list memory unit that stores an authentication key, which is selected by the registered user, as the authentication key list, designating a combination between the authentication key and a time of reproduction of the authentication key and one or two or more keys, which are not included in the authentication key list, and a time of reproduction of the one or two or more keys, thereby creating authentication data which is continuously reproduced; an authentication data transmission step of transmitting, by the transaction system, the authentication data to the terminal device; an authentication information reception step of receiving, by the transaction system, authentication information which is generated by an authenticating action which is performed by the user on the terminal device by reproducing the authentication data in the terminal device; and an authentication information collation step of collating, by the transaction system, the authentication information and normal authentication information which is specified from the authentication data, thereby determining whether the user is an authenticated person, wherein each of the authentication key data and the key data, which are used in the authentication data creating step, specifies sound or an image, which is reproduced at a time of authentication, the authentication information, which is received in the authentication information reception step, is data for specifying a time in which the authentication key recognized by the user is reproduced, the data being generated from a time in which an authentication operation, which is executed by the user by recognizing that the authentication key is being reproduced, is accepted in the terminal device during the reproduction of the authentication data, and the authentication information collation step collates whether the time in which the authentication key is reproduced, which is specified from the authentication information, agrees with a time in which the authentication key should be reproduced, which is specified from the authentication data, thereby determining whether the user is the authenticated person.

In addition, the person oneself authenticating method according to the present invention may be characterized in that the authentication information, which is received in the authentication information reception step and is the data for specifying the time in which the authentication key recognized by the user is reproduced, is composed of bits which discriminate whether the authentication operation has been accepted or not, the bits being recorded in every unit time during the reproduction of the authentication data in the terminal device, and the authentication information collation step determines that the user is the authenticated person, in a case where the bits recorded in the authentication information, which correspond to the time in which the authentication key should be reproduced, which is specified from the authentication data, indicate that the authentication operation has been accepted.

Further, the person oneself authenticating method according to the present invention may be characterized in that the authentication information collation step creates first sequence data composed of first bit strings into which the bits recorded in the authentication information are divided in units of a time of reproduction of the authentication key or the key in accordance with a time of change of the reproduction of the authentication key or the key, which is specified from the authentication data, creates second sequence data composed of second bit strings which are formed by deleting bits corresponding to a predetermined grace time from a first bit of each of the first bit strings in the first sequence data, and determines, from each of the second bit strings in the second sequence data, whether the authentication operation has been accepted or not, with respect to each time in which the authentication key or the key has been reproduced.

Further, the person oneself authenticating method according to the present invention may be characterized in that the authentication information collation step creates first sequence data composed of first bit strings into which the bits recorded in the authentication information are divided in units of a time of reproduction of the authentication key or the key in accordance with a time of change of the reproduction of the authentication key or the key, which is specified from the authentication data, creates second sequence data composed of second bit strings which are formed by deleting bits corresponding to a predetermined grace time from a first bit of each of the first bit strings in the first sequence data, specifies a predetermined number of last bits of each of the second bit strings in the second sequence data, and determines whether the authentication operation has been accepted or not, with respect to each time in which the authentication key or the key has been reproduced.

Further, the person oneself authenticating method according to the present invention may be characterized in that the grace time is set for each individual user by a total value of a time that is needed for the user to determine a change of the key, and a time that is needed for judging the authentication key, and the authentication information collation step creates, at a time of creating the second sequence data, the second sequence data by using the second bit string from which only the bit, which corresponds to the time that is needed for judging the authentication key, is deleted with respect to the authentication key or the key which is positioned at a beginning of the authentication data.

In addition, the person oneself authenticating method according to the present invention may be characterized in that the authentication data creating step sets the time of reproduction of each of the authentication key and the key, which are used in the authentication data, at least at a time that is longer than the time in which the time corresponding to the bit number necessary for authentication is added to the grace time, thereby creating the authentication data.

Further, the person oneself authenticating method according to the present invention may be characterized in that the authentication information collation step creates sequence data composed of bit strings into which the bits recorded in the authentication information are divided in units of a time of reproduction of the authentication key or the key in accordance with a time of change of the reproduction of the authentication key or the key, which is specified from the authentication data, specifies a predetermined number of last bits of each of the bit strings in the sequence data, and determines whether the authentication operation has been accepted or not, with respect to each time in which the authentication key or the key has been reproduced.

Further, the person oneself authenticating method according to the present invention may be characterized in that the authentication data creating means sets the time of reproduction of each of the authentication key and the key, which are used in the authentication data, at a time that is longer than the time corresponding to a predetermined number of bits which are specified in the authentication information collation means, thereby creating the authentication data.

Further, the person oneself authenticating method according to the present invention may be characterized by including a step of receiving, by the terminal device, the authentication data from the transaction system and reproducing the authentication data; a step of recording, by the terminal device, the time in which the authentication operation, which is performed by the user by recognizing that the authentication key is being reproduced, is detected, and the time in which the authentication operation is not detected, from the start time of the reproduction of the authentication data, thereby generating the authentication information that is to be transmitted to the transaction system; and a step of transmitting the authentication information to the transaction system.

Further, the person oneself authenticating method according to the present invention may be characterized by including a candidate key list transmission step of creating, by the transaction system, a candidate key list in which two or more sounds that are selectable as authentication sounds are selected from a designated key list according to a predetermined condition, and transmitting the candidate key list to the terminal device, the designated key list being stored in a designated key list memory unit which stores a designated key list in which keys that are usable as authentication keys are designated; and an authentication key information accepting step of accepting, by the transaction system, information, which specifies keys that are selected from the candidate key list by the registered user as authentication keys, from the terminal device. The authentication key list memory unit stores, as an authentication key list, the authentication keys that are specified from the information that is accepted by the authentication key information accepting step.

Further, the person oneself authenticating method according to the present invention may be characterized by including a user ID generating step of generating, by the transaction system, a user ID for identifying the registered user, by whom the authentication sound list is stored in the authentication key list memory unit, by applying a predetermined function to at least one item of master information which is stored in a master information memory unit which stores master information including the ID code, name and authentication key of the registered user. In the authentication sound list memory unit, the user ID and the authentication sound list are associated and stored, with the user ID being used as the key.

Advantageous Effect of the Invention

By the person oneself authenticating system and person oneself authenticating method according to the present invention, which authenticate whether a user, who has accessed a transaction system from a terminal device, is a registered user or not by using sound or video as an authentication key, it becomes possible to person oneself authenticating means which is mainly used for Internet banking or the like and is high in security, and can be carried out by functions ordinarily provided in a PC, a mobile phone, or the like, the authenticating means being less in burden required for user authentication key management and authentication operations.

BRIEF DESCRIPTION OF THE SEVERAL VIEWS OF THE DRAWING

FIG. 3 is a block diagram showing the structure of the person oneself authenticating system according to the present invention;

FIG. 4 is a view showing an example of a customer master in the person oneself authenticating system according to the present invention;

FIG. 5 is a view showing an example of an authenticating music list in the person oneself authenticating system according to the present invention;

FIG. 6 is a view showing an example of an authenticating music selection screen, which is displayed on a user terminal, in the person oneself authenticating system according to the present invention;

FIG. 12 is a third view showing a method of adjusting "jitter" occurring in a user's authentication operation in the person oneself authenticating system according to the present invention;

FIG. 13 is a fourth view showing a method of adjusting "jitter" occurring in a user's authentication operation in the person oneself authenticating system according to the present invention;

DETAILED DESCRIPTION OF THE INVENTION

Best modes for carrying out the present invention will now be described in detail with reference to the accompanying drawings. The description below is given of examples in which the present invention is applied to a transaction system of Internet banking, and sound source data of music is used as an authentication key. However, the transaction system is not limited to Internet banking, and may be some other transaction system such as a settlement system of electronic commerce transactions. In addition, the authentication key is not limited to music, and may be other sound source data such as voice or sound effects, or a moving picture such as motion video, or still image data such as photographs or characters. As described above, the embodiments of the present invention are not limited to the examples which will be described below.

Figure 1:
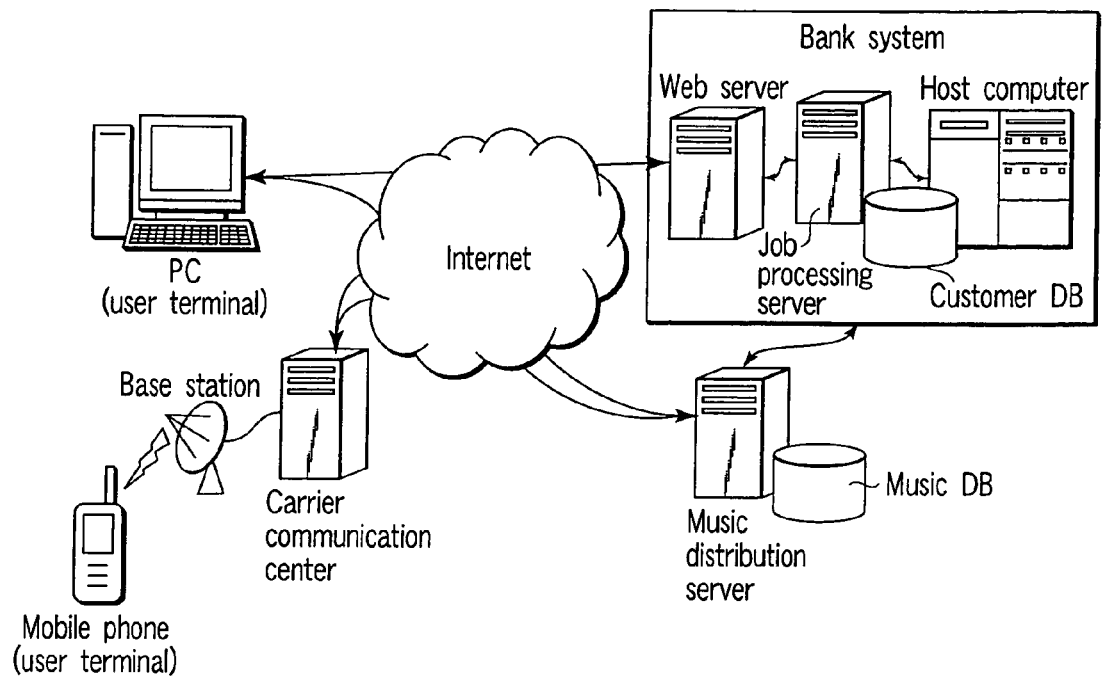
FIG. 1 is a view showing the outline of a first embodiment of a person oneself authenticating system according to the present invention.
Figure 2:
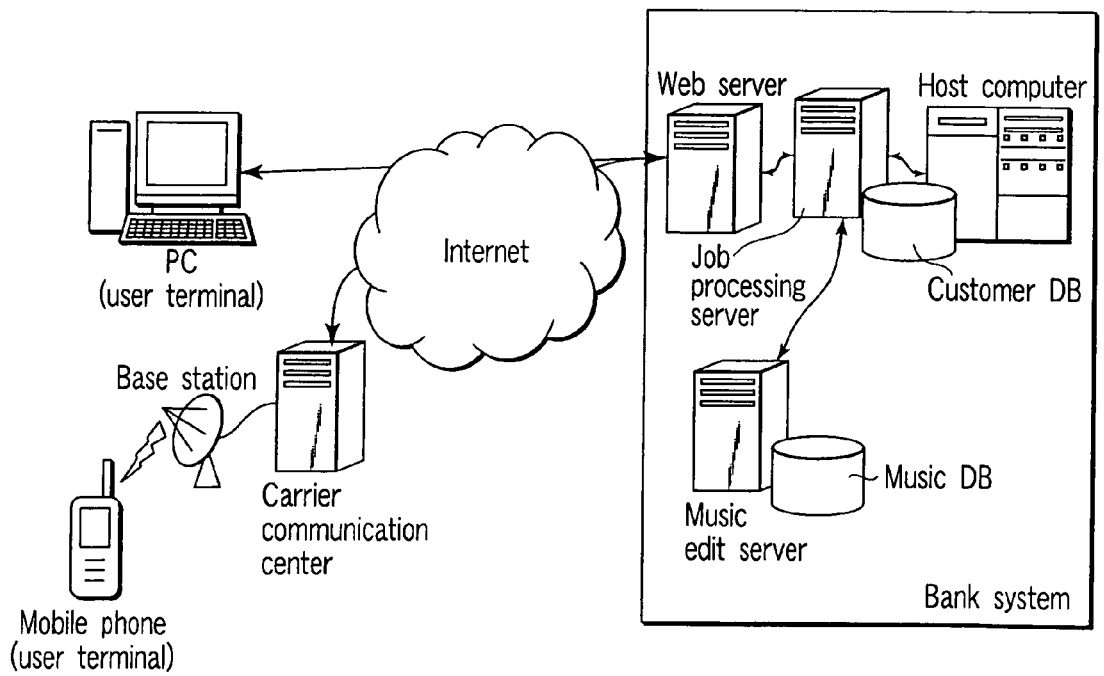
FIG. 2 is a view showing the outline of a second embodiment of the person oneself authenticating system according to the present invention.
Figure 7:
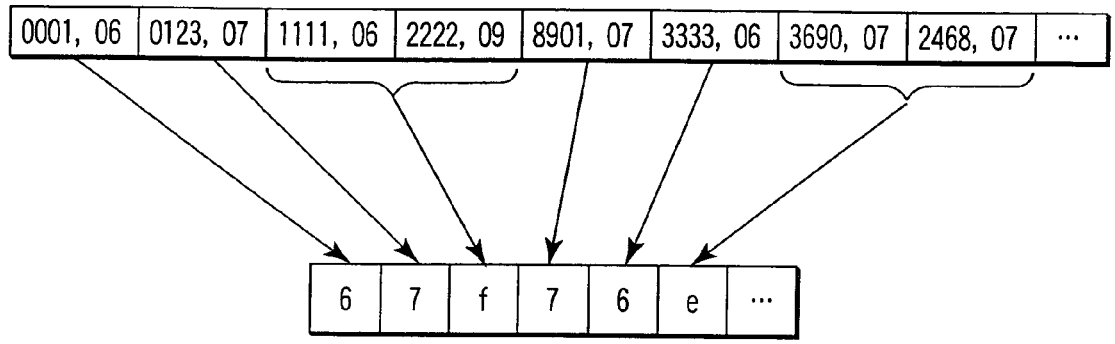
FIG. 7 is a view showing an example of authenticating sound source data which is generated in the person oneself authenticating system according to the present invention.
Figure 8:
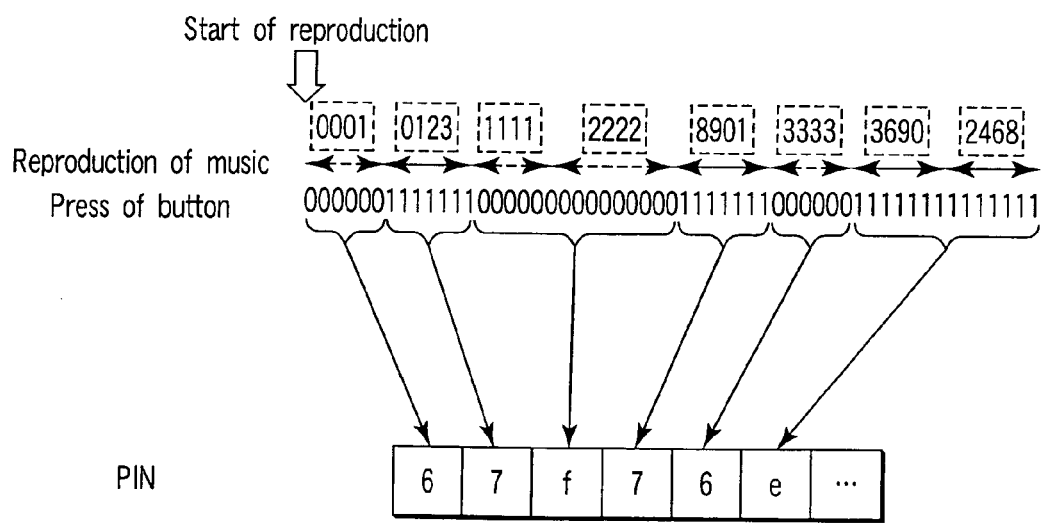
FIG. 8 is a view showing a first example of authentication information collation in the person oneself authenticating system according to the present invention.
Figure 9:
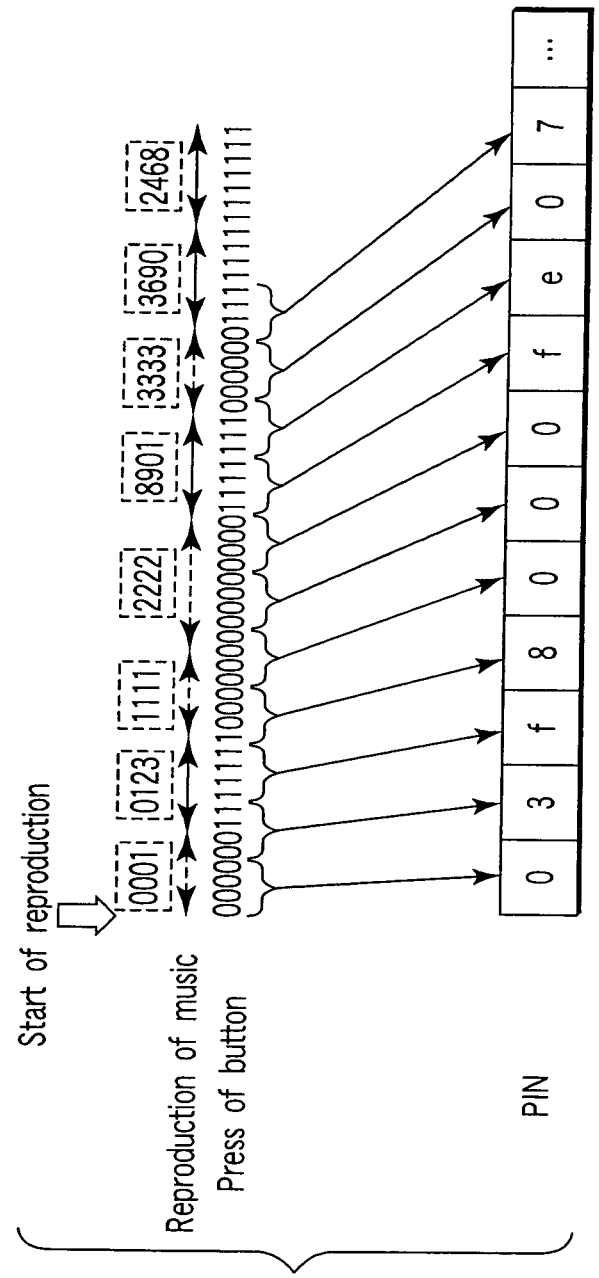
FIG. 9 is a view showing a second example of authentication information collation in the person oneself authenticating system according to the present invention.
Figure 14:
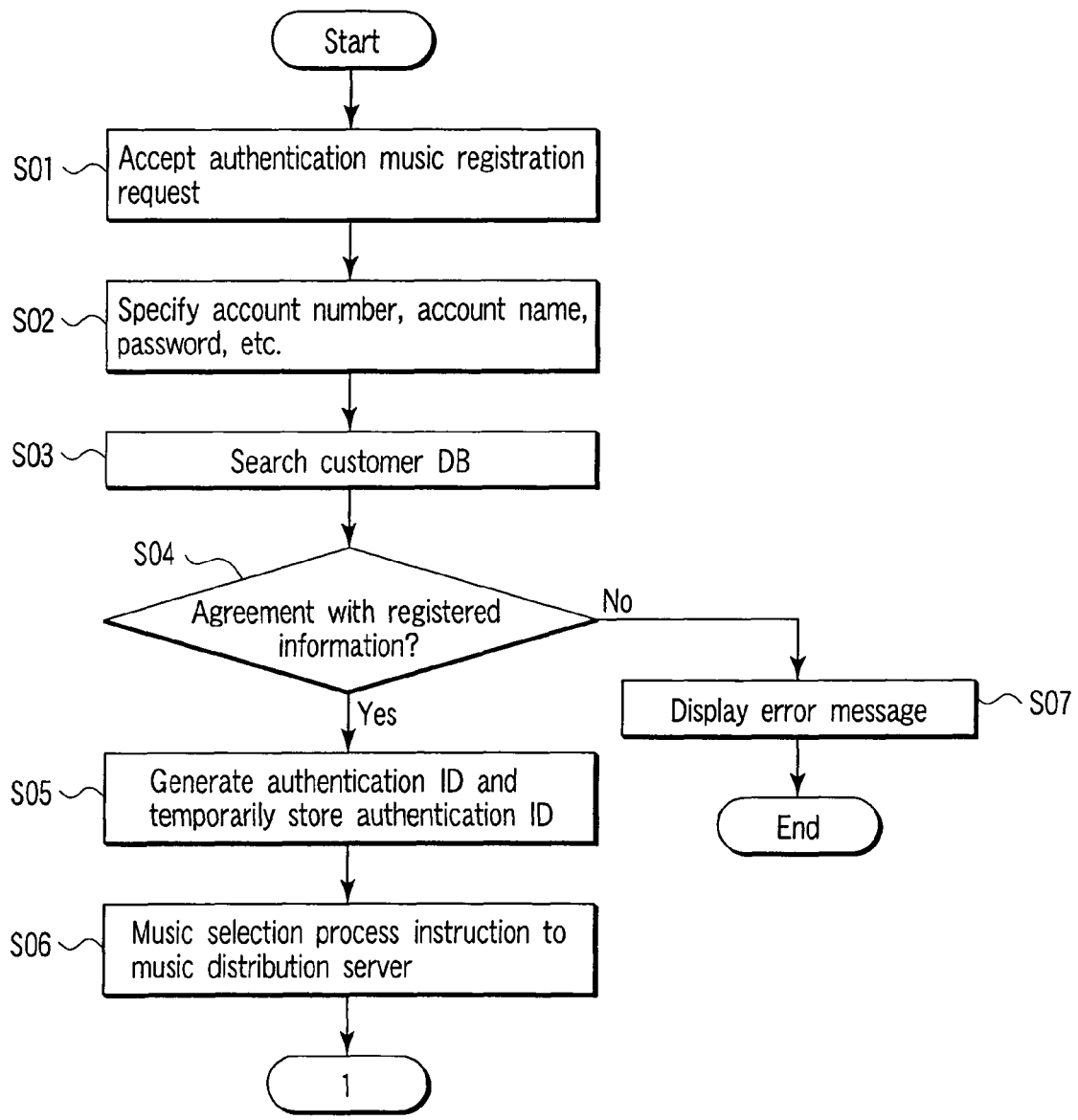
FIG. 14 is a first flow chart illustrating a process flow for registering an authenticating music list in the person oneself authenticating system according to the present invention.
Figure 15:
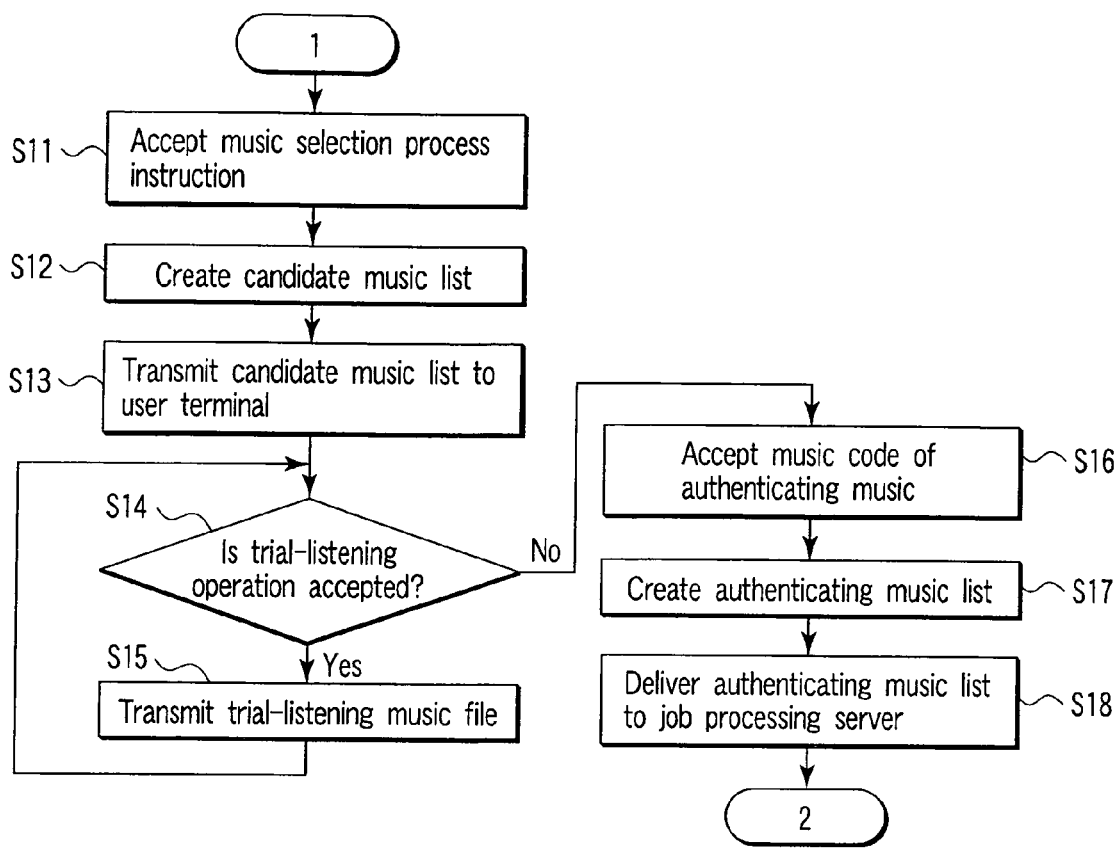
FIG. 15 is a second flow chart illustrating the process flow for registering the authenticating music list in the person oneself authenticating system according to the present invention.
Figure 16:
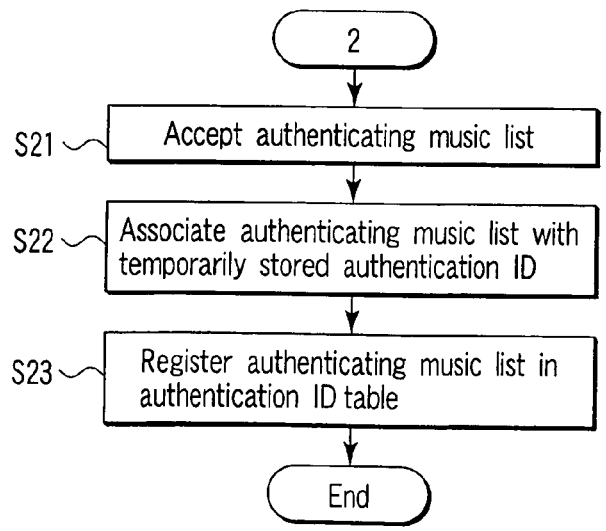
FIG. 16 is a third flow chart illustrating the process flow for registering the authenticating music list in the person oneself authenticating system according to the present invention.

FIG. 1 and FIG. 2 are views showing the outlines of first and second embodiments of a person oneself authenticating system according to the present invention. FIG. 3 is a block diagram showing the structure of the person oneself authenticating system according to the present invention. FIG. 4 is a view showing an example of a customer master in the person oneself authenticating system according to the present invention. FIG. 5 is a view showing an example of an authenticating music list in the person oneself authenticating system according to the present invention. FIG. 6 is a view showing an example of an authenticating music selection screen, which is displayed on a user terminal, in the person oneself authenticating system according to the present invention. FIG. 7 is a view showing an example of authenticating sound source data which is generated in the person oneself authenticating system according to the present invention. FIG. 8 and FIG. 9 are views showing first and second examples of authentication information collation in the person oneself authenticating system according to the present invention. FIG. 10 to FIG. 13 are first to fourth views showing methods of adjusting "jitter" occurring in a user's authentication operation in the person oneself authenticating system according to the present invention. FIG. 14 to FIG. 16 are first to third flow charts illustrating a process flow for registering an authenticating music list in the person oneself authenticating system according to the present invention. FIG. 17 to FIG. 20 are first to fourth flow charts illustrating a process flow for executing person oneself authentication by the person oneself authenticating system according to the present invention. FIG. 21 is a flow chart illustrating a process flow for adjusting "jitter" occurring in a user's authentication operation in the person oneself authenticating system according to the present invention. FIG. 22 is a view showing an example of a guide screen of an authentication operation which is displayed on the user terminal.

As is shown in FIG. 1 and FIG. 2, the person oneself authenticating system according to the present invention can be practiced as person oneself authenticating means in an Internet banking system using a PC or a mobile phone. A user connects the PC or mobile phone to the Internet and accesses a Web server which controls, e.g. display of a Web page of the Internet banking. Then, a login process is required for performing a transaction. In a job processing server, an authentication key, such as a password, which is sent from the PC or mobile phone, is collated with a pre-registered one in a customer DB. If the collation shows agreement, the user is authenticated as the registered user, and login to a transaction page or the like is permitted.

In the person oneself authenticating system of the present invention, person oneself authentication is executed by causing the user to discriminate a preselected authentication key, which is, in this example, authenticating music that is music for authentication. In the embodiment shown in FIG. 1, a music distribution server for distributing music for authentication is provided outside a bank system. When person oneself authentication is executed, the music distribution server receives information relating to authenticating music which is pre-registered by the user, edits music for authentication in which authenticating music and music other than the authenticating music, which are acquired from a music DB, are combined, and sends the music for authentication to the PC or mobile phone. In the PC or mobile phone which has received the music for authentication, the music for authentication is reproduced. The user performs an operation, for instance, depression of a predetermined button, while the authenticating music is being reproduced, thereby generating authentication information which specifies the time during which the user executes the operation such as the depression of the button. The authentication information is sent to the bank system. The bank system receives the authentication information, and confirms whether the user has executed the operation, such as the depression of the button, during the time in which the authenticating music was being reproduced, on the basis of the time that is recorded in the authentication information, thereby executing person oneself authentication.

In the embodiment shown in FIG. 2, the same flow of authentication is performed, but the edit and transmission of the music for authentication are performed within the bank system. Specifically, a music edit server and a music DB are provided in the bank system. In the case of executing the person oneself authentication, the music edit server edits the music for authentication, which includes the user's authenticating music, and directly transmits the music for authentication to the PC or mobile phone.

Next, the operation of the person oneself authenticating system according to the invention is described in detail with reference to a block diagram of FIG. 3 and examples of data structures shown in FIG. 4 to FIG. 9. The block diagram of FIG. 3 shows the structure corresponding to the first embodiment shown in FIG. 1. The functions necessary for the embodiment of FIG. 2 are not greatly different from the structure of the block diagram of FIG. 3, except that the registration of the authenticating music and the edit function of the music for authentication, which are executed by the music distribution server 40 in FIG. 3, are executed by the music edit server in the embodiment shown in FIG. 2, and that the communication with a user terminal 10 is concentrated in a Web server 20.

As the user terminal 10, use is made of a terminal device such as a PC, a mobile phone or a PDA (Personal Digital Assistant). The user terminal 10 is equipped with a Web browser for connection to the Internet and for executing data communication. The user terminal 10 can start the Web browser and access the Web server 20 which provides services relating to browser Internet banking, and the user terminal 10 is equipped with a music reproducing program 11 which can play back authenticating music which is used in person oneself authentication at the time of login.

The music reproducing program 11 is not necessarily a dedicated one for person oneself authentication of the present invention, and is not specifically limited if it has a reproducing function of a sound source file. For example, a music reproducing player that is attached to the OS of the PC may be used, or a program which is downloadable from the Web server 20 may be used. The music reproducing program 11 is not necessarily stored in an HDD (Hard Disk Drive) of the user terminal 10. For example, a USB (Universal Serial Bus) sound device, which stores the music reproducing program 11 for Internet banking users, may be distributed and may be connected to the user terminal 10, and the music reproducing program 11 may be read out at the time of executing person oneself authentication.

In a case where moving pictures or still images, in place of music, are displayed as an authentication key while the moving pictures or still images are being switched, a program for reproducing images is activated in the user terminal 10. This reproducing program is not particularly limited, like the above-described case of music. In order to display moving pictures or still images while switching them, use may be made of, e.g. a plug-in which is dedicated to a generally used Web browser.

The user terminal 10 is provided with an authenticating program 12 for executing a necessary process for person oneself authentication and sending to the Web server 20 authentication information which is generated by the authentication operation that is executed in the user terminal 10. The authenticating program 12 is a dedicated one for use in the person oneself authentication of the present invention, which may be always stored in the HDD of the user terminal 10 or may be transmitted from the Web server 20 at the time of login and temporarily stored in a memory area at the time of execution of the person oneself authentication. In the case of the former, a dedicated memory medium which stores the authenticating program 12 may be distributed to the Internet banking user and the authenticating program 12 may be installed in the user terminal 10 by the user, or the authenticating program 12 may be downloaded from the Web server 20.

As will be described later, the authenticating program 12 instructs the user to press a predetermined key on the keyboard when the user recognizes that the authenticating music is being reproduced, and executes recording by setting bits while the button is being pressed. Accordingly, the authenticating program 12 needs to have a function of discriminating the state in which the predetermined key on the keyboard is pressed. In addition, in order to make the user execute an exact authentication operation, the authenticating program 12 should preferably have a function of executing the training of the authentication operation, and a function of displaying guidance explaining the rules of the authentication operation, as shown in an example of FIG. 22.

A job processing server 30 is a computer which constitutes a part of the bank system, and has a function of executing a person oneself authentication process at a time of login for the user who has accessed Internet baking services, or requesting the host computer 50 to perform necessary processes (e.g. balance inquiry, transfer instruction) in response to the user's request. In order to realize this function, various job processing programs are stored in the job processing server 30, and necessary processes are executed by reading out them. In order to execute the person oneself authentication of the present invention, a user registration program 31 which register authenticating music for each user and an authentication program 32 which executes a process for person oneself authentication need to be provided.

The job processing server 30 is connected to a customer database 33 which stores information relating to Internet banking users. The customer database 33 is a functionally specified one, and may be provided in a database server which is a computer different from the job processing server 30, or may be stored in the HDD of the job processing server 30. The customer database 33 is provided with a customer master 331 which stores basic information of each individual registered user, and an authenticating music list 332 which stores a list of authenticating music selected by each individual registered user. The customer master 331 and authenticating music list 332 are also functionally specified ones with physical structures being not specifically limited, and may be provided in a database server which is a different computer.

FIG. 4 shows an example of the customer master 331 which is provided in the customer database 33. Basic information, such as an account number, an account name and a password, are stored in a record which is provided for each individual registered user. In this example, while this password is used at each time of login, a secret number (for registration) is used at a time of first registration of authenticating music. In the case of adopting authentication by authenticating music as person oneself authenticating means, in place of password authentication, it is not an indispensable requirement to register the password.

FIG. 5 shows an example of the authenticating music list 332 which is provided in the customer database 33. A list of authenticating music, which is used for person oneself authentication, is stored in a record which is provided for each individual registered user. The registered authenticating music is a list of music which the user memorizes for authentication. The music is used in order to authenticate that the user, who has identified the authenticating music when the music is played, is the authentic person. It is thus preferable to register authenticating music which is selected by the user, but authenticating music, which is designated by the bank side, may be registered and reported to the user. The number of songs, which are registered as authenticating music, may be one. However, in order to enhance security, a plurality of songs should preferably be registered and changed at proper times.

In the example of the authenticating music list 332 shown in FIG. 5, three variables, "Tmin", "Tch" and "Tjd", are defined and stored in the list (these variables may be stored in the customer master 331). These variables are defined for individual users as follows:

Tmin: a minimum play time for which each music is at least reproduced,

Tch: a maximum time that is needed for judging a change of music, and

Tjd: a maximum time that is needed to take an action by judging whether music is right or wrong.

Of these variables, "Tch" and "Tjd" are considered to have large differences among individuals due to, e.g. the ages of users. It is thus preferable to set "Tch" and "Tjd" for each individual user by reflecting, e.g. the condition of use and the success/failure of past authentication. The method of setting "Tch" and "Tjd" for each individual user is not particularly limited. For example, initial values may be set by considering, e.g. the age or computer skill, and subsequently the values may be updated at proper times by recording the authentication operation each time authentication is executed and by reflecting the actual result of occurrence of jitter. On the other hand, as regards "Tmin", it is an indispensable condition that the length of "Tmin" exceeds the sum of "Tch" and "Tjd" and the time corresponding to the necessary number of bits for authentication (however, consideration of "Tch" is needless for the first song). This value, too, may be set individually by reflecting each user's "Tch" and "Tjd", or a value exceeding the value of a user, whose "Tmin" is the longest, may be set as a common value for all users.

In the example of FIG. 5, an authentication ID, which is different from the account number or account name, is used as a key that identifies the user. The authentication ID is generated by a hash function, or the like, on the basis of master information such as the account number and account name, and the master information and the authenticating music list can be associated by applying the hash function or the like to the master information. Under this presupposition, if the customer master 331 and the authenticating music list 332 are separately managed, even in case the authenticating music list 332 leaks, the user cannot be specified unless the customer master 331 or the hash function or the like is acquired. Therefore, the security in case of data leakage can be enhanced. In addition, if such security of customer information management is considered, it is advantageous to separately manage the customer master 331 and the authenticating music list 332 in physically different database servers.

The music distribution server 40 is a computer which is provided separately from the bank system and is managed by a music distribution agent, etc., and has a function necessary for registration and distribution of music. In order to realize this function, various application programs are stored in the music distribution server 40 and necessary processes are executed by reading them out. In order to execute the person oneself authentication of the present invention, the music distribution server 40 needs to be provided with a music registration program 41 which prompts each user to select authenticating music and register the authenticating music, and a music distribution program 42 which edits music for authentication for use in person oneself authentication and distributing the music for authentication.

The music distribution server 40 is connected to a music database 43 which stores information relating to music that is used for person oneself authentication. The music database 43 is a functionally specified one, and may be provided in a database server which is a computer different from the music distribution server 40, or may be stored in the HDD of the music distribution server 40. The music database 43 is provided with a music master 431 which stores basic information, such as a title and a genre of music, which is used for person oneself authentication, and a music file 432 which is sound source data for reproducing each music.

In the second embodiment shown in FIG. 2, the function of the music edit server does not greatly different from the music distribution server 40 shown in FIG. 3. Although the music edit server has the function of editing music for authentication, which is included in the music distribution program 42, but the distribution of the music for authentication is executed by the Web server 20.

The host computer 50 is a mission-critical system in the bank system for executing not only Internet banking services but also processes necessary for bank businesses. In the present invention, the function of the host computer 50 is not specifically limited. The host computer 50 executes, for example, management of deposit/withdrawal information of bank accounts, bank transfer, and a rewrite process of balance due to bank transfer, etc. A process, which is requested by the Internet banking service, is executed by a process instruction from the job processing server 30.

Registration of authenticating music in the authenticating music list 332, which is shown in the example of FIG. 5, is executed in the following manner. If the user terminal 10 accesses the Web server 20, the account number and password, which are input to the user terminal 10, are transmitted in order to log in to the Internet banking. The job process server 30 refers to the customer master 331 and accepts login if the input account number exists and the password corresponding to the account number agrees with the input password. Thus, the session with the user terminal 10 is established. A Web page, which is transmitted from the Web server 20, includes a menu display for authenticating music registration.

If the menu for authenticating music registration is selected in the user terminal 10, the Web server 20 accepts this, and the user registration program 31 is activated in the job process server 30. With the operation of the user registration program 31, in the case where a dedicated password for the authenticating music registration is set, the password from the user terminal 10 is received here. The received password is collated with the password stored in the customer master 331, and agreement of the passwords is confirmed, and the authenticating music registration process is advanced. The job processing server 30 reads out the master information of the user from the customer master 331, generates an authentication ID by applying a hash function to the account number or the like, and temporarily stores the generated authentication ID in the memory area.

Then, a request for selection of candidate music which is registered as authenticating music and for transmission of an authenticating music selection screen to the user terminal 10 is issued to the music distribution server 40. In the music distribution server 40, the music registration program 41 is activated. With the operation of the music registration program 41, a plurality of candidate songs are selected from the music master 431, and a display file of the authenticating music selection screen is generated and sent to the user terminal 10. The algorithm for selecting candidate songs is not specifically limited, and may be selected at random, or may be selected according to the user's attributes (for example, in order to exclude the estimation of the authenticating music from the tendency that young users would select pops, it is effective to select Japanese enka songs or classic music as candidate music). The method in which the music distribution server 40 transmits the display file to the user terminal 10 is not specifically limited. For example, the information for specifying the session with the Web server 20 including the IP address of the user terminal 10 is delivered from the job process server 30, and the connection to the user terminal 10 may be established by using the IP address. Alternatively, the display file may be delivered from the music distribution server 40 to the Web server 20, and the display file may be transmitted in the session that is established between the Web server 20 and the user terminal 10. Alternatively, a one-time ID may be assigned in the job processing server 30, and may be sent to the user terminal 10 and music distribution server 40. When the user terminal 10 accesses the link to the music distribution server 40, which is displayed by the Web server 20, the connection between the user terminal 10 and the music distribution server 40 may be established by using the one-time ID.

FIG. 6 shows an example of the authenticating music selection screen which is displayed on the user terminal 10 in this manner. A list of candidate songs, which are selectable as authenticating music, is displayed, and the user selects songs from the list, which are to be registered as authenticating music. The selected authenticating music is specified by a music code (it should suffice if the music code is associated with a field which indicates presence/absence of selection of each song, and the music code may not necessarily be displayed on the screen as in the example shown in FIG. 6), and the list of authenticating music is sent to the music distribution server 40.

As shown in FIG. 6, such a structure may be adopted that a trial-listening button is provided for each song, and with the selection of the button, the song is played back for trial-listening. The music file for trial-listening is stored as a music file 432 in the music database 43, and the music file is distributed upon request from the user terminal 10.

The music distribution server 40, which has received the list of authenticating music, delivers the authenticating music list, in which each authenticating music is specified by the music code, to the job processing server 30 of the bank system. In the job processing server 30, the temporarily stored authentication ID and the authenticating music list are associated and registered in the authenticating music list 332 of the customer database 33, with a new record being provided.

Next, the person oneself authentication using the authenticating music is executed in the following manner. In the case where person oneself authentication is needed in, e.g. login to the Internet banking system by the user, the authentication program 32 is activated in the job processing server 30. With the operation of the authentication program 32, after the confirmation of the account number and the collation of the password are executed, the information necessary for specifying the authentication ID is read out from the customer master 331, and the authentication ID of the user is generated. If the authentication ID is generated, the music code of the authenticating music corresponding to the authentication ID is read out from the authenticating music list 332.

Music codes of music, other than the authenticating music, which can be distributed, are stored in the job processing server 30. The music codes, which are stored in the authenticating music list, and the music codes of music other than the authenticating music are combined, and a music play list that is used for the music for authentication is created. The music codes of the authenticating music, which is used for single-time authentication, may be all the music codes of the registered authenticating music, or a part thereof.

The play list for the music for authentication is created, for example, as shown in FIG. 7. In this example, songs which are registered as authenticating music are four songs of music codes 0123, 8901, 3690 and 2468. These songs and other songs of music codes 0001, 1111, 2222 and 3333, which are different from the authenticating music, are combined and arranged, thus constituting the music for authentication. The numeral that is added to the end of the music code indicates a play time. If the sound source data of the music for authentication is reproduced, the song of the music code 0001 is reproduced for six seconds, and the song of the music code 0123 is reproduced for seven seconds in this order.

As described above, the play time of each song included in the music for authentication is designated. As regards the play time, it is preferable not to designate the time for completely playing the music file 432 of each song, but to arbitrarily designate a part of the time. The variations of the music for authentication are increased by how to set the play time, as well as by properly setting the time that is necessary for authentication. The risk of accidental agreement can be reduced, and the security can be enhanced.

Specifically, as has been described with reference to the example shown in FIG. 5, the variables of "Tmin", "Tch" and "Tjd", which are defined in the authenticating music list 332 that is specified by the authentication ID, are read out, and the time of play of each song is designated. The play time is set to be longer than the time that is designated by "Tmin".

In the case where a moving picture file, in place of the music file, is used as an authentication key, the moving picture file for authentication may similarly be edited. In the case where sounds (e.g. sounds with fixed pitches, such as "do", "re" and "mi"), which do not vary with time, or still images displaying photos or characters, are used as authentication keys, the process of generating data for authentication becomes different. In this case, sounds or still images are designated as authentication keys and keys other than the authentication keys, and sound source data in which these sounds are reproduced while being switched, or image data in which the still images are reproduced while being switched, is generated as data for authentication. For example, in the case where numerals "1" and "2" are designated as authentication keys, the numerals "1" and "2" are combined with numerals "3" and "4" which are other than the authentication keys, thereby generating data for authentication, which is to be displayed on the screen of the user terminal 10 at such intervals as "five seconds for 1, six seconds for 3, seven seconds for 2, five seconds for 4, . . . ". The method of setting the time for displaying each numeral is the same as the above-described method of using "Tmin", "Tch" and "Tjd". In the case of this method, the function of the music distribution server 40, in particular, the function corresponding to the music file 432 of the music database 43, is not necessarily required. In the job processing server 30, authentication keys ("1" and "2" in the above example), which are recorded in the part corresponding to the authenticating music list 332, may be acquired, and may be combined with other keys ("3" and "4" in the above example), thereby creating data for authentication.

If the sound source data of the music for authentication, which is edited as shown in FIG. 7, is reproduced, the time in which the authenticating music is played and the time in which the song other than the authenticating music is played are switched in the order of 6 seconds, 7 seconds, 15 seconds, 7 seconds, 6 seconds and 14 seconds. It is possible to authenticate whether the user is the registered user or not, on the basis of whether the user can properly distinguish these times. The play list of the music for authentication, which is created here, is temporarily stored in the job processing server 30 so that the play list may be used in the collation for person oneself authentication.

If the play list of the music for authentication is thus created, a transmission request for the music for authentication, in which the music codes and play times of the songs to be played and the order of play are designated, is issued from the job processing server 30 to the music distribution server 40. In the music distribution server 40, the music distribution program 42 is activated. With the operation of the music distribution program 42, the sound source data of the music for authentication is edited.

In the music distribution server 40, sound source data is read out from each music file 432 according to the play list, and the sound source data of the music for authentication, in which the sound source data corresponding to the designated play times are combined, is edited and sent to the user terminal 10. In the user terminal 10, the music reproducing program 11 and authenticating program 12 are activated. With the operation of the music reproducing program 11, the sound source data of the music for authentication is read in the buffer in the user terminal 10. With the operation of the authenticating program 12, the time in which the user discriminates the authenticating music is recorded from the time point of the start of reproduction.

The user listens to the reproduced music for authentication by a speaker or headphone which is provided on the user terminal 10. The user terminal 10 displays instructions of the authentication operation which is to be performed by the user when the music for authentication is being reproduced. For example, an operation of pressing a predetermined key on the keyboard or an operation of pressing a predetermined button on the screen is requested while the authenticating music is being reproduced. Thereby, it is possible to specify the time in which the user discriminates that the music that is being played is the authenticating music. The specifying of the time is executed by the operation of the authenticating program 12.

As shown in FIG. 8, in the case where the sound source data of the music for authentication, which is shown in FIG. 7, is reproduced, the song of the music code 0001 is reproduced for six seconds and the song of the music code 0123 is reproduced for seven seconds in this order. By setting bits when the user presses a predetermined button (in this example, data is recorded in units of one second, and bit "1" is set when the button is pressed), it becomes possible to record the time in which the user discriminates that the music that is being played is the authenticating music. In the example of FIG. 8, from the bits that indicate the pressing of the button, it is understood that the user has discriminated that the authenticating music and the music other than the authenticating music are switched in the order of 6 seconds, 7 seconds, 15 seconds, 7 seconds, 6 seconds and 14 seconds.

The information indicating the time history, which shows how the time in which the user discriminates that the music that is being played is the authenticating music and the time in which the user discriminates that the music that is being played is not the authenticating music, which are understood by the operation of the authenticating program 12 as described above, have passed, is specified as a PIN (authentication information for use in collation for person oneself authentication). The PIN is sent from the user terminal 10 to the Web server 20. The PIN that is sent is not specifically limited and, for example, use may be made of run-length data (63d749 . . . ) which is generated from combinations of 0 and 1 as shown in FIG. 8, or use may be made of hexadecimal data (038003f8 . . . ) which is generated in every four bits as shown in FIG. 9.

The PIN that is received by the Web server 20 is delivered to the job processing server 30. On the other hand, since the play list of the music for authentication is temporarily stored in the job processing server 30, it is possible to specify the time in which the user should discriminate the authenticating music in the case where the play list is played. In the job processing server 30, with the operation of the authentication program 32, the time in which the user has recognized that the music that is being played is the authenticating music, which is specified from the PIN, is collated with the time in which the user should discriminate that the music that is being played is the authenticating music, which is specified from the play list. If both times agree, the user is authenticated as the registered user.

In actual authentication, a slight error of timing may occur in the user's authentication operation on the user terminal 10, and it may be assumed that the time that is specified from the PIN differs from the normal time. As regards so-called "jitter" occurring due to such a reason, it is possible to cope with "jitter" by setting the authentication program 32, for example, such that it is determined that the time that is specified from the PIN agrees with the normal time if a difference therebetween is, e.g. about one second, or selection of only one second is ignored as an erroneous operation.

Such "jitter" is adjusted by adopting adjusting methods as will be described below with reference to FIG. 10 to FIG. 13, and more exact authentication can be executed. The process for adjusting jitter, which will be described below, is executed by the operation of the authentication program 32 in the job processing server 30 which receives the PIN.

Figure 10:
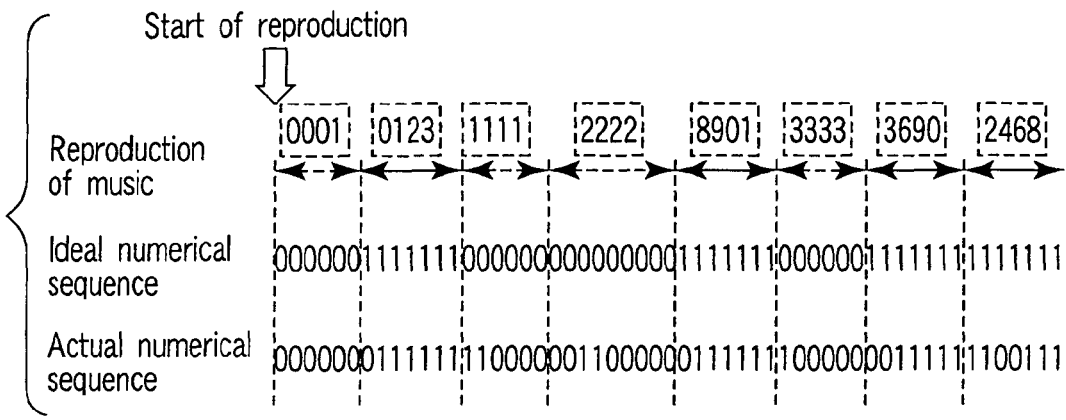
FIG. 10 is a first view showing a method of adjusting "jitter" occurring in a user's authentication operation in the person oneself authenticating system according to the present invention.

To start with, if the job processing server 30 receives the PIN, the job processing server 30 divides the PIN into blocks corresponding to songs which are switched, as shown in FIG. 10, in accordance with an ideal numerical sequence which is to be generated from bits when authentication is correctly executed, so that an actual numerical sequence which is generated from bits recorded in the PIN may correspond to the ideal sequence. The reproduction of the ideal numerical sequence is not indispensable. The PIN may be divided on the basis of bit numbers corresponding to the play times of the respective songs which are designated in the play list of the music for authentication.

Figure 11:
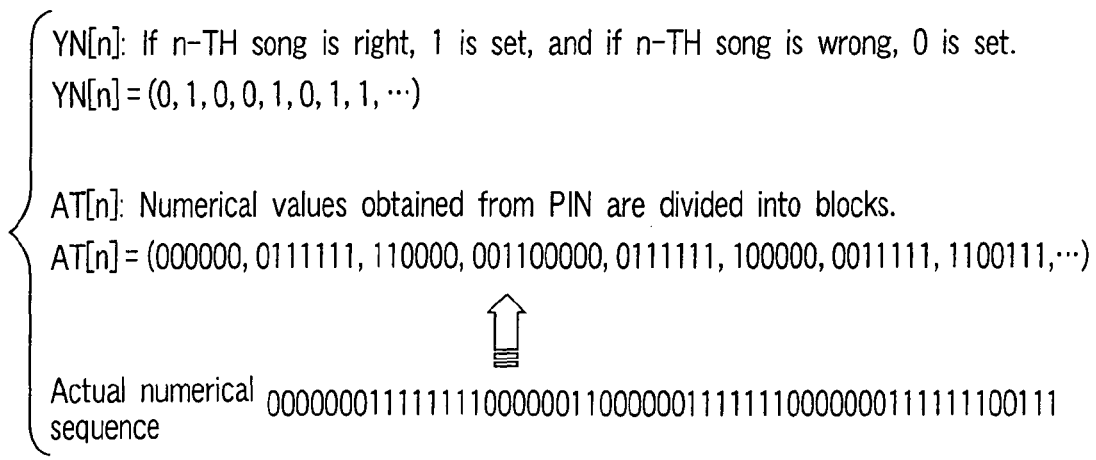
FIG. 11 is a second view showing a method of adjusting "jitter" occurring in a user's authentication operation in the person oneself authenticating system according to the present invention.

Next, in accordance with the above division, two sequences, which are shown in an example of FIG. 11, are created. The first sequence YN[n] is a sequence which is generated in such a manner that if an n-th song is the authenticating music, "1" is set, and if the n-th song is not the authenticating music, "0" is set. This sequence may be generated in advance before the music for authentication is transmitted to the user terminal 10, and may be temporarily stored in the job processing server 30. The second sequence AT[n] is a sequence which is obtained by dividing the numeral sequence, which is generated from the bits recorded in the PIN, into bit strings which are associated with the blocks corresponding to the songs that are switched.

Subsequently, a process for eliminating jitter from the AT[n] is executed. It is considered that jitter occurs due to the time that is needed for the user to judge a change of music, and the time that is needed to take an action by judging whether music is the authenticating music or not. Hence, by eliminating the bits corresponding to the above-described "Tch" and "Tjd", it becomes possible to execute person oneself authentication by eliminating jitter. Thus, the values of "Tch" and "Tjd" of the user, who has executed the authentication operation, are read out from the authenticating music list 332 (or customer master 331) of the customer database 33, and a process is executed for deleting bits, which correspond to "Tch" and "Tjd", from each of the divided bit strings in the AT[n].

Specifically, as shown in an example of FIG. 12, since the total value of the user's "Tch" and "Tjd" is "3", a process of deleting the first three-digit bits from each bit string is executed. As regards the bit string corresponding to the first song, however, since the judgment of the change of the song is needless, there is no need to reflect "Tch". Thus, only "Tjd" is considered, and only the first one-digit bit is deleted. In this manner, a sequence AT'[n] is created, and collation between the sequence AT'[n] and the sequence YN[n] is executed. If all bits included in a bit string in the AT'[n] comprises only the YN[n], the collation of this bit string is determined to be "OK". If even one inconsistent bit is included, additional collation is executed. In the example of FIG. 12, the fourth song and the eighth song are determined to be objects of additional collation.

The additional collation is executed on the presupposition that if the user is the registered user, the user must correctly execute the authentication operation at the last part of the reproduction of each song. Specifically, collation is executed with respect to only a predetermined number of last bits of each of the bit strings, and if these bits agree, the collation of this bit string is determined to be "OK". In an example of FIG. 13, it is defined that collation is executed with respect to the last three-digit bits. As regards the fourth song and eighth song that are the objects of additional collation, the last three digits of YN[4] is 000 while AT'[4]=0, and the last three digits of YN[8] is 111 while AT'[8]=1. Thus, the collation of both cases is determined to be "OK".

If the collation between AT'[n] and YN[n] is executed up to the additional collation and the collation is determined to be "OK" with respect to all bit strings, the user is successfully authenticated, and the transaction process is started. In accordance with the level that is required for authentication, the user may be authenticated in a case where bit strings, which are collated to be "OK", exceed a predetermined reference level even if all bit strings are not collated to be "OK".

The above description relates to the example in which first several digits are first deleted from each bit string, and then last several digits are collated as the additional collation for a disagreeing bit string. In order to increase the precision of authentication, it is desirable to execute the deletion of first digits and the additional collation of last digits at the same time. However, the adjustment of jitter may be executed by one of them. In particular, in the case where the adjustment is to be executed by a simple method with a less load on the system process, it is thinkable to adopt only the latter additional collation method.

Referring to flow charts of FIG. 14 to FIG. 16, a description is given of a process flow for registering an authenticating music list by the person oneself authenticating system according to the present invention. FIG. 14 shows a process flow of the job processing server which has accepted an authenticating music registration request. FIG. 15 shows a process flow of the music distribution server which transmits a candidate music list to the user terminal and creates an authenticating music list. FIG. 16 shows a process flow of the job processing server which registers the authenticating music list that is received from the music distribution server.

Upon receiving an authenticating music registration request from the user (S01), the job processing server specifies the user's account number, account name and password that is set for authenticating music registration, which are accepted by the Web server (S02). Of these, the account number or the like is used as a key and the customer database is searched for the user's master information (S03), thereby confirming whether the master information is present and the account name and password agree with the information registered in the master information (S04).

If the master information is not present or if any one of the information items disagrees, data for displaying an error message is transmitted to the user terminal (S07). If the master information is present and the agreement of the information is confirmed, a hash function, or the like, is applied to predetermined information of the master information, thereby to generate an authentication ID, and the generated authentication ID is temporarily stored in the memory area (S05). Further, a process instruction for prompting the user to select music for authentication is transmitted to the music distribution server (S06).

If the music distribution server receives the process instruction for music selection from the job processing server (S11), music is selected from the music database according to a predetermined condition, and a candidate music list, which can be registered as authenticating music, is created (S12). A screen file for displaying the candidate music list is transmitted to the user terminal (S13). The method for transmitting the candidate music list from the music distribution server to the user terminal is not specifically limited. For example, the job processing server may deliver the IP address of the user terminal to the music distribution server. A link button, in which a URL for the user to browse the candidate music list is embedded, may be set on the display screen of the user terminal, and the music distribution server may be accessed from the user terminal. A display screen file of the candidate music list may be delivered to the Web server on the job processing server side, and may be displayed on the user terminal.

If the candidate music list is displayed on the user terminal, there may be a case in which a trial-listening request, which designates a music code, is issued from the user terminal. If the music distribution server accepts the operation of the trial-listening request (S14), the music distribution server reads out a music file, which is specified by the music code, from the music database, and transmits the music file for trial-listening to the user terminal (S15). The music file for trial-listening, which is to be transmitted, may be a dedicated music file for trial-listening which is stored in the music database, and the dedicated music file may be read out and transmitted. Alternatively, a part of an ordinary music file may be cut out for trial-listening and may be transmitted.

If the user selects authenticating music, the music distribution server accepts the music code of the selected authenticating music (S16). The authenticating music list is created on the basis of the accepted music code (S17), and the authenticating music list is delivered to the job processing server (S18).

If the job processing server receives the authenticating music list from the music distribution server (S21), the authenticating music list is associated with the authentication ID that is temporarily stored in the memory area (S22), and the authenticating music list is registered on the authentication ID table for registering the authenticating music in the customer database (S23). Thus, the process of authenticating music registration is finished.

Figure 17:
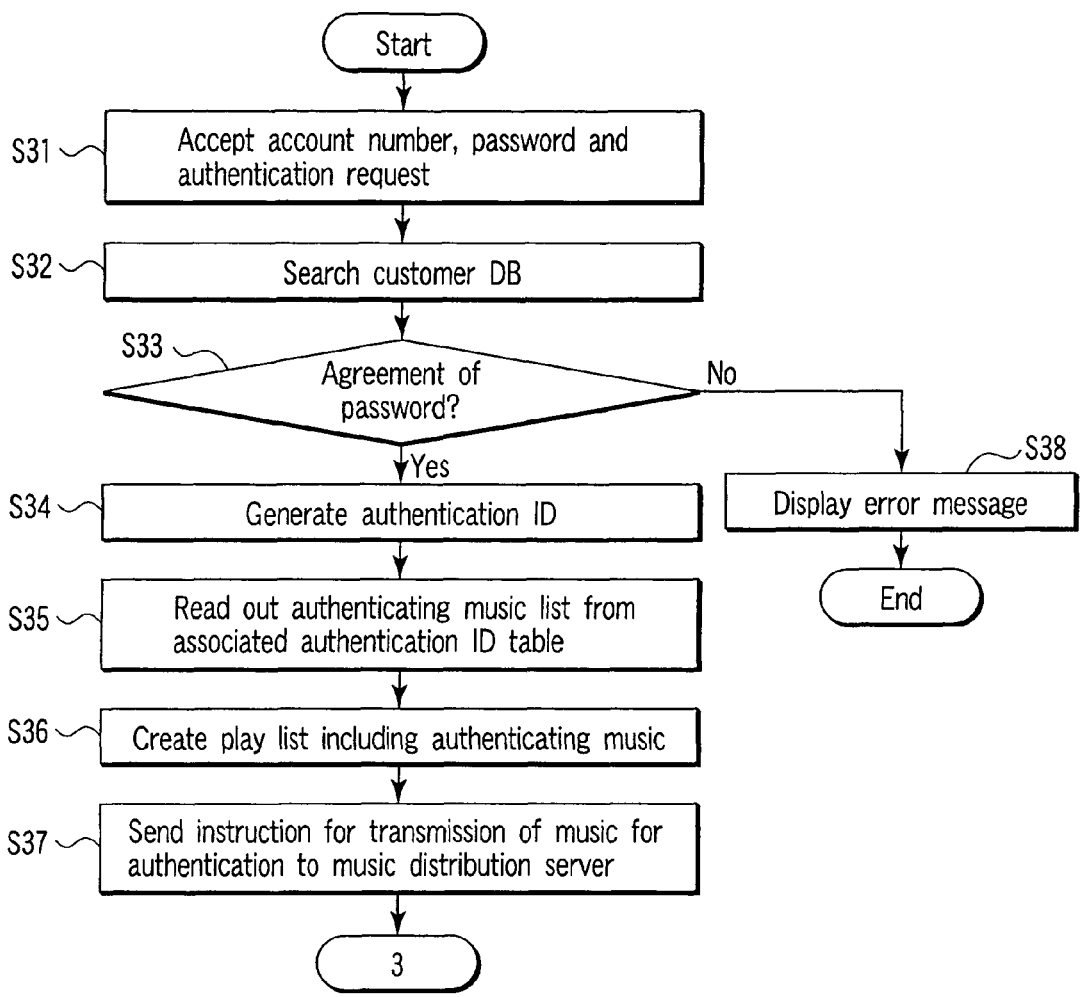
FIG. 17 is a first flow chart illustrating a process flow for executing person oneself authentication by the person oneself authenticating system according to the present invention.
Figure 18:
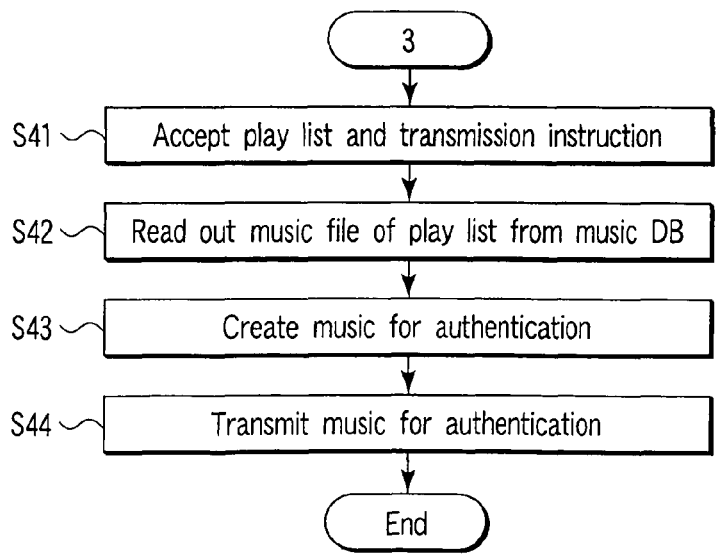
FIG. 18 is a second flow chart illustrating the process flow for executing person oneself authentication by the person oneself authenticating system according to the present invention.
Figure 19:
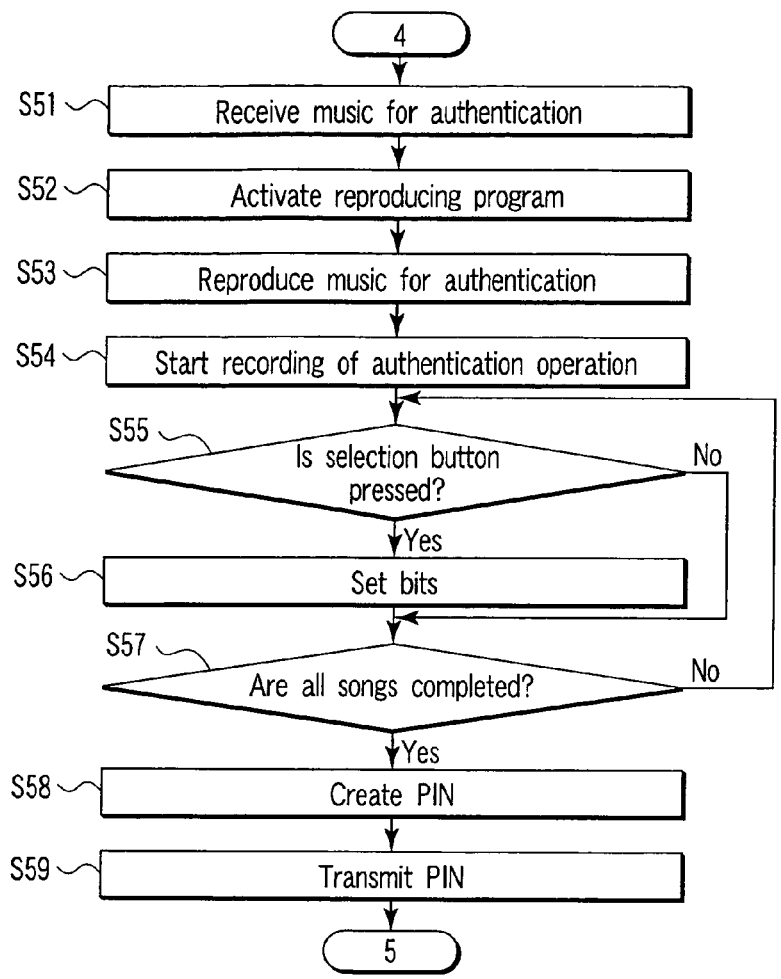
FIG. 19 is a third flow chart illustrating the process flow for executing person oneself authentication by the person oneself authenticating system according to the present invention.
Figure 20:
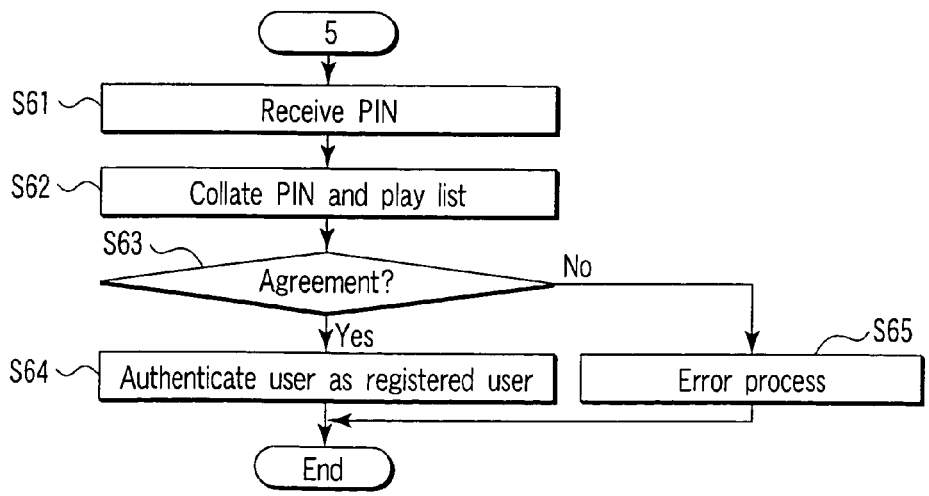
FIG. 20 is a fourth flow chart illustrating the process flow for executing person oneself authentication by the person oneself authenticating system according to the present invention.
Figure 21:
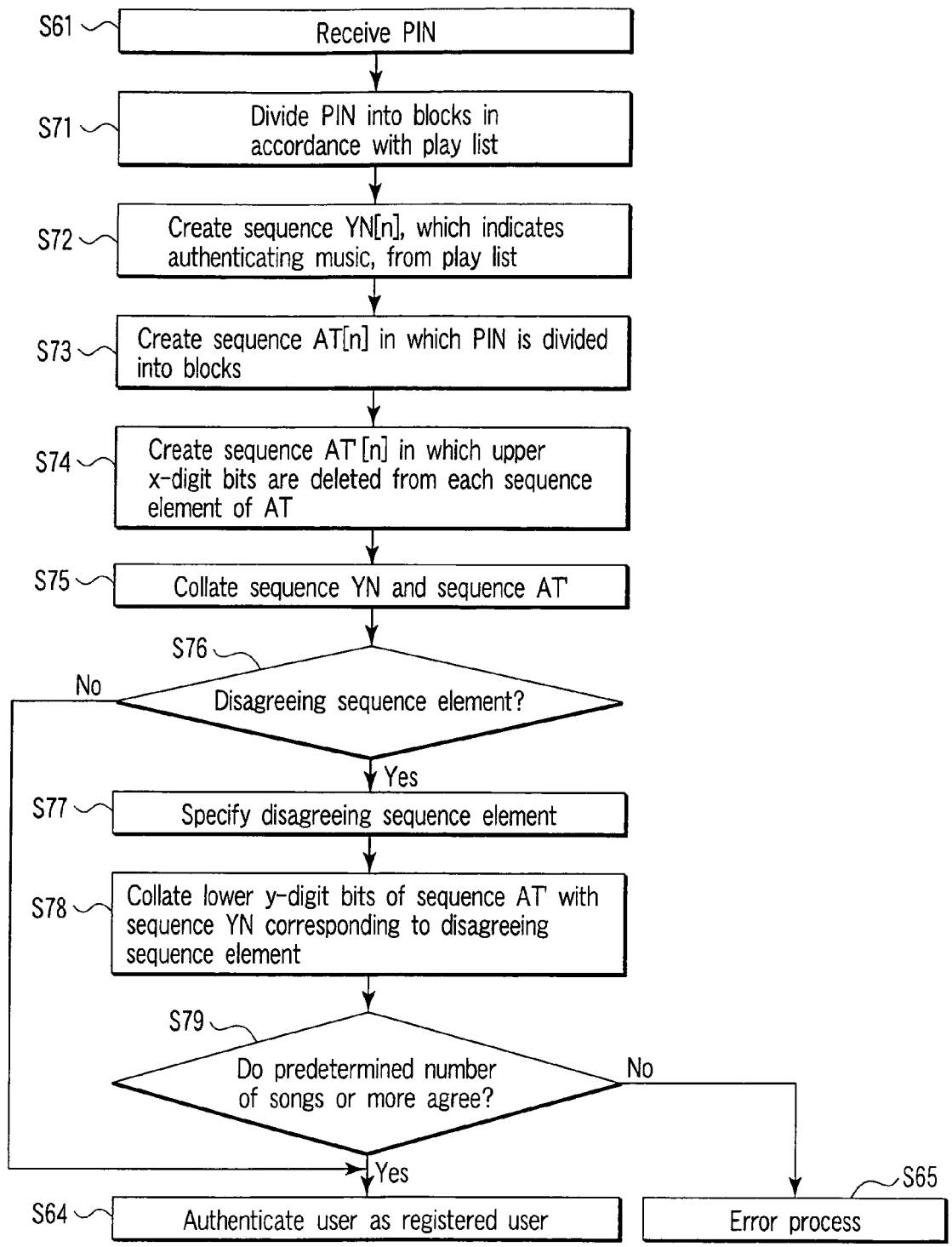
FIG. 21 is a flow chart illustrating a process flow for adjusting "jitter" occurring in a user's authentication operation in the person oneself authenticating system according to the present invention.
Figure 22:
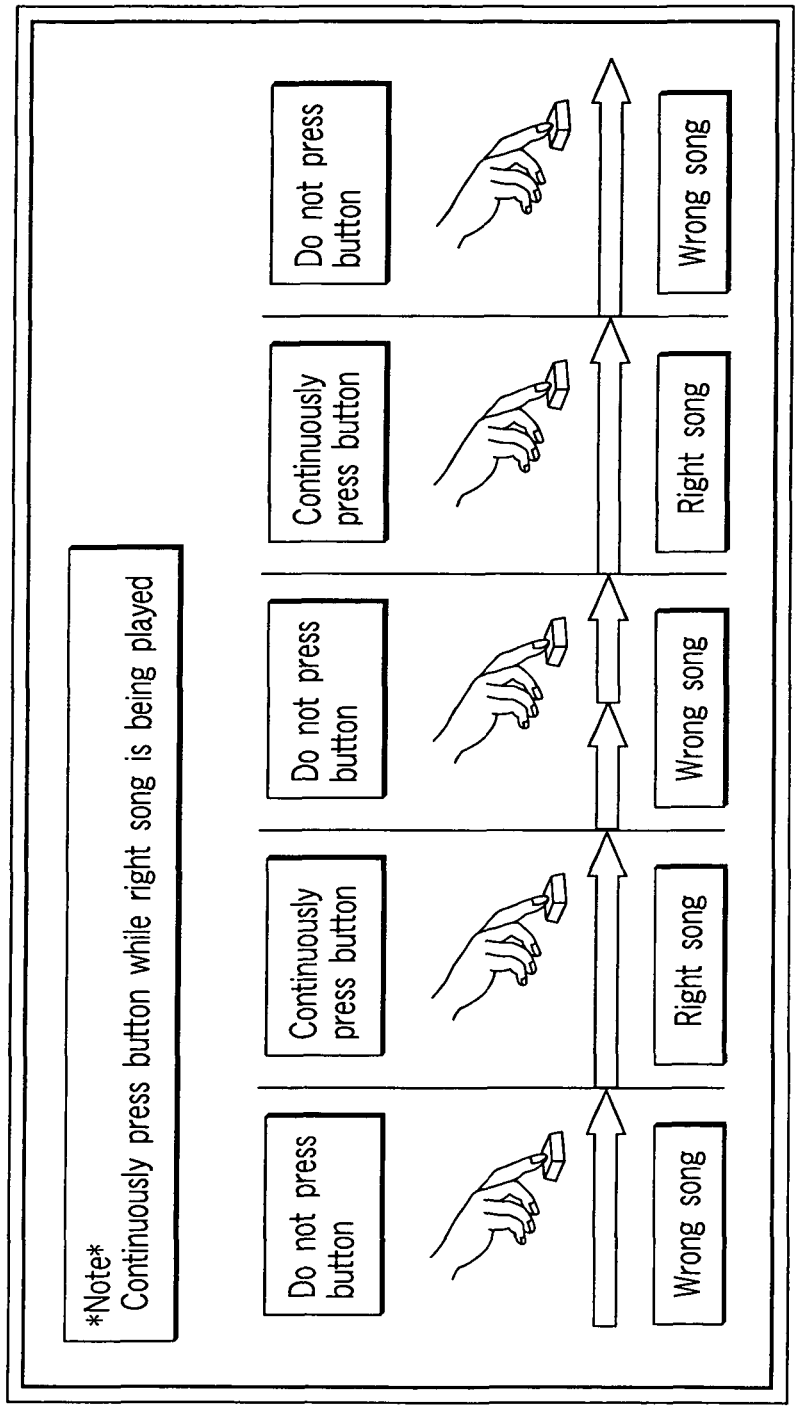
FIG. 22 is a view showing an example of a guide screen of an authentication operation which is displayed on the user terminal.

Referring to flow charts of FIG. 17 to FIG. 21, a description is given of a process flow for executing person oneself authentication by the person oneself authenticating system according to the present invention. FIG. 17 shows a process flow of the job processing server which receives a person oneself authentication request from the user at the time of login, and creates a play list. FIG. 18 shows a process flow of the music distribution server which transmits, to the user terminal, sound source data of music for authentication according to the play list. FIG. 19 is a process flow for reproducing the sound source data of the music for authentication in the user terminal, and generating authentication information. FIG. 20 shows a process flow of the job processing server which executes person oneself authentication from the authentication information that is accepted from the user terminal. FIG. 21 is a process flow of adjusting "jitter" occurring in the user authentication operation in the person oneself authentication process flow shown in FIG. 20.

When a request for login or a predetermined transaction is issued, the job processing server accepts an authentication request for authenticating the registered user with the account number, password, etc. (S31). Of these, the account number or the like is used as a key and the customer database is searched for the user's master information (S32), thereby confirming whether the password agrees with the registered information (S33). If the password disagrees, data for displaying an error message is transmitted to the user terminal (S38).

If the password agrees, a hash function, or the like, is applied to predetermined information of the master information, thereby generating an authentication ID (S34). As regards the password authentication in S33, in the present embodiment, both the authentication by the password and the authentication by the authenticating music are executed. In the case where the authentication by the authenticating music is adopted as person oneself authenticating means in place of the password authentication, the step of the authentication by the password may be omitted.

The authenticating music list, which corresponds to the generated authentication ID, is read out from the authentication ID table of the customer database (S35), and a play list, in which the authenticating music included in the authenticating music list and the music other than the authenticating music are combined, is created (S36). In the play list, the music codes of the selected songs and the play times of the respective songs are designated. The algorithm for creating the play list is not specifically limited. Use may be made of an algorithm in which music, which is hard to guess by a third person, is selected according to a predetermined condition, or songs may be selected at random. Subsequently, the created play list and a transmission instruction for music for authentication, which is created by editing the sound source data of the music for authentication according to the play list and is to be transmitted to the user terminal, are sent to the music distribution server (S37).

If the music distribution server receives the play list and the transmission instruction for the music for authentication (S41), the music distribution server reads out music files of the music codes, which are designated in the play list, from the music database (S42), and edits sound source data according to the play times and play order which are designated in the play list, thereby creating the sound source data of the music for authentication (S43). The created sound source data of the music for authentication is transmitted to the user terminal (S44). The method of transmitting the sound source data of the music for authentication from the music distribution server to the user terminal is not specifically limited. The above-described method of transmitting the candidate music list for registration may be applied.

If the user terminal receives the sound source data of the music for authentication (S51), the reproducing program for use in music reproduction, for instance, is activated (S52), and the reproduction of the sound source data of the music for authentication is started (S53). At the same time, the program for authentication is activated, and the recording of the authentication operation, which is executed by the user, is started from the start point of the reproduction of the sound source data of the music for authentication (S54).

The user listens to the music for authentication by the speaker or headphone. If the user recognizes that the authenticating music is being reproduced, the user presses the selection button on the screen or a predetermined key on the keyboard. In the user terminal, the pressing of the selection button is detected (S55). At the timing when the selection button is pressed, a bit, which indicates that the user discriminates the authenticating music, is set (S56). If the reproduction of all songs included in the music for authentication is completed (S57), a PIN is created from the time history which indicates the passing of the time during which the bits are set from the start time of the reproduction of the sound source data of the music for authentication (S58), and the created PIN is transmitted to the Web server (S59).

The PIN, which is sent from the user terminal, is received by the job processing server via the Web server (S61). The time in which the user has recognized that the music that is being played is the authenticating music, which is specified from the PIN, is collated with the time in which the user should discriminate that the music that is being played is the authenticating music, which is specified from the play list that is temporarily stored in the job processing server (S62). It is determined whether both times agree or not (S63). If both times agree, the user is authenticated as the registered user (S64), and the authenticating process is finished. If both times disagree, the person oneself authentication is determined to have failed, and an error process is executed (S65) and the authenticating process is finished.

In the case of adjusting so-called "jitter" occurring in the user's authentication operation in the process flow up to the collation (S62) between the PIN and the play list and the confirmation (S63) of agreement therebetween, the following process is executed. If the PIN is received by the job processing server (S61), the PIN is divided into blocks in units of a song on the basis of the play times that are designated in the play list (S71). In addition, the sequence YN[n], which indicates the order of arrangement of the authenticating music and the music other than the authenticating music, is created from the play list (S72).

Subsequently, the sequence AT[n], in which the PIN is decomposed into bit strings corresponding to the divided blocks, is created (S73). On the basis of the bit strings which are the elements of the sequence AT[n], the change of the music is determined and the authenticating music is recognized. An x-number of digits of bits, which correspond to the time that is set in consideration of the time necessary for executing a predetermined operation, are deleted from each bit string from the uppermost bit thereof, and the sequence AT'[n] is created (S74). The thus created sequence YN[n] is collated with each sequence element of the sequence AT'[n] (S75), and it is confirmed whether there is a disagreeing element (S76). If all bits in all sequence elements agree, the user is authenticated as the registered user (S64).

In the case where there is a disagreeing sequence element, it is determined to which of the sequentially ordered songs the disagreeing sequence element corresponds (S77). Then, the sequence YN[n] of the disagreeing sequence element is collated with lower y-digit bits which reflect the authentication operation at the last part of each song (S78). It is confirmed whether the total number of agreeing cases, in combination with the number of agreeing cases in the preceding collation between the sequence YN[n] and the sequence AT'[n], exceeds a predetermined reference value (S79). If the total number exceeds the predetermined reference value, the user is authenticated as the registered user (S64). If the total number does not exceed the reference value, the person oneself authentication is determined to have failed, and an error process is executed (S65) and the authenticating process is finished.

DESCRIPTION OF REFERENCE NUMERALS

10 . . . user terminal
11 . . . music reproducing program
12 . . . authenticating program
20 . . . Web server
30 . . . job processing server
31 . . . user registration program
32 . . . authentication program
33 . . . customer DB
331 . . . customer master
332 . . . authenticating music list
40 . . . music distribution server
41 . . . music registration program
42 . . . music distribution program
43 . . . music DB
431 . . . music master
432 . . . music file
50 . . . host computer.

What is claimed is:

1. A person oneself authenticating method for authenticating, in a transaction system, whether a user who has accessed the transaction system from a terminal device is a registered user, comprising:
  an authentication request accepting step of accepting, by the transaction system, an authentication request by the user who has accessed from the terminal device;
  an authentication data creating step of selecting, by the transaction system, at least one authentication key from an authentication key list of the user whose authentication request is accepted, the authentication key list being stored in an authentication key list memory unit that stores an authentication key, which is selected by the registered user, as the authentication key list, combining at least a part of authentication key data of the authentication key and at least a part of key data of one or two or more keys, which are not included in the authentication key list, thereby creating authentication data which is continuously reproduced;
  an authentication data transmission step of transmitting, by the transaction system, the authentication data to the terminal device;
  an authentication information reception step of receiving, by the transaction system, authentication information which is generated by an authenticating action which is performed by the user on the terminal device while the authentication data in the terminal device is reproduced, wherein the received authentication information is a string of binary data; and
  an authentication information collation step of collating, by the transaction system, a first string of the binary data of the received authentication information with a second string of binary data specified from normal authentication information which is specified from the authentication data, thereby determining whether the user is an authenticated person,
  wherein each of the authentication key data and the key data, which are used in the authentication data creating step, is sound source data or image data, which varies with time in a time period of reproduction,
  wherein the first string of binary data represents the time period specifying at least one time period during which an authentic action is performed and the second string of binary data represents a time period in which the authentication key should be reproduced, which is specified from the authentication data, wherein the first string of binary data is created by creating sequence data composed of first bit strings by dividing strings of bits recorded in the authentication information at the position corresponding to the points of time of the change of reproduction of the authentication key or the key, creating the first strings of binary data by deleting one or more bits from the beginning of each of the first bit strings in the sequence data, wherein the number of bits deleted corresponding to a grace time, wherein the grace time is set for each individual user by a total volume of a time that is needed for the user to determine a change of the key, by setting initial values considering the age or skill and subsequently updating the initial values each time the authentication is executed, and wherein the authentication information collation step determines whether the created first bit strings are collated with second bit strings, corresponding to the first bit strings, of the normal authentication information or not, respectively, and to collate one or more last bits of the created first bit strings which are not collated with the second bit strings with the second bit strings, respectively, when the created first bit strings are not collated with second bit strings.

2. A person oneself authenticating method for authenticating, in a transaction system, whether a user who has accessed the transaction system from a terminal device is a registered user, comprising:

an authentication request accepting step of accepting, by the transaction system, an authentication request by the user who has accessed from the terminal device;

an authentication data creating step of selecting, by the transaction system, at least one authentication key from an authentication key list of the user whose authentication request is accepted, the authentication key list being stored in an authentication key list memory unit that stores an authentication key, which is selected by the registered user, as the authentication key list, designating a combination between the authentication key and a time of reproduction of the authentication key and one or two or more keys, which are not included in the authentication key list, and a time of reproduction of the one or two or more keys, thereby creating authentication data which is continuously reproduced;

an authentication data transmission step of transmitting, by the transaction system, the authentication data to the terminal device;

an authentication information reception step of receiving, by the transaction system, authentication information representing a user authenticating action on the terminal device while the authentication data in the terminal device is reproduced, wherein the received authentication information is a string of binary data; and an authentication information collation step of collating, by the transaction system, a first string of the binary data of the received authentication information with a second string of binary data specified from normal authentication information which is specified from the authentication data, thereby determining whether the user is an authenticated person, wherein each of the authentication key data and the key data, which are used in the authentication data creating step, specifies sound or an image, which is reproduced at a time of authentication, wherein the first string of binary data represents the time period specifying at least one time period during which an authentic action is performed and the second string of binary data represents a time period in which the authentication key should be reproduced, which is specified from the authentication data, wherein the first string of binary data is created by creating sequence data composed of first bit strings by dividing strings of bits recorded in the authentication information at the position corresponding to the points of time of the change of reproduction of the authentication key or the key, creating the first strings of binary data by deleting one or more bits from the beginning of each of the first bit strings in the sequence data, wherein the number of bits deleted corresponding to a grace time, wherein the grace time is set for each individual user by a total volume of a time that is needed for the user to determine a change of the key, by setting initial values considering the age or skill and subsequently updating the initial values each time the authentication is executed, and wherein the authentication information collation step determines whether the created first bit strings are collated with second bit strings, corresponding to the first bit strings of the normal authentication information or not respectively, and to collate one or more last bits of the created first bit strings which are not collated with the second bit strings with the second bit strings respectively, when the created first bit strings are not collated with second bit strings.

* * * * *